United States Patent [19]
Koashi

[11] Patent Number: 6,154,708
[45] Date of Patent: Nov. 28, 2000

[54] METHOD OF PROCESSING AND CORRECTING SPECTRAL DATA IN TWO-DIMENSIONAL REPRESENTATION

[75] Inventor: Katsue Koashi, Toyonaka, Japan

[73] Assignee: Kurashiki Boseki Kabushiki Kaisha, Okayama, Japan

[21] Appl. No.: 09/082,116

[22] Filed: May 20, 1998

[30] Foreign Application Priority Data

Nov. 17, 1997 [JP] Japan .................................. 09-314976

[51] Int. Cl.⁷ ...................................................... G01J 3/00
[52] U.S. Cl. ............................ 702/40; 702/155; 356/318; 356/320; 600/408
[58] Field of Search ................................ 702/40, 32, 155, 702/159, 28; 600/407, 408, 473, 476; 356/318, 319, 320

[56] References Cited

U.S. PATENT DOCUMENTS

| | | | |
|---|---|---|---|
| 4,975,862 | 12/1990 | Keller et al. ............................ | 382/112 |
| 5,124,932 | 6/1992 | Lodder ...................................... | 702/30 |
| 5,379,238 | 1/1995 | Stark ......................................... | 702/19 |
| 5,660,181 | 8/1997 | Ho et al. .................................. | 600/408 |
| 5,813,987 | 9/1998 | Modell et al. .......................... | 600/473 |
| 5,828,452 | 10/1998 | Gillispie et al. ........................ | 356/318 |

*Primary Examiner*—Marc S. Hoff
*Assistant Examiner*—Bryan Bui

[57] ABSTRACT

The present method of processing spectral data calculates the first to fourth derivative spectra of an original spectrum with respect to the wavenumber and creates a two-dimensional representation by plotting coordinates consisting of the derivative values of some order as their abscissas and the original spectral values or derivative values of another order different from that order as their ordinates. In this two-dimensional plotting, maximal points, minimal points, maximal slope points (inflection points) and the like are clearly represented, so that a great amount of accurate feature information about the analyzed object can be easily obtained.

17 Claims, 41 Drawing Sheets

PK1=1.0, PK2=0.8, dPP=2.5

D3D4; dPP=2.5

D3D4; dPP=2.5

(a) FILTER LENGTH: 7 POINTS
NOISE LEVEL: NOISEFREE, 0.005, 0.01 pp (b) FILTER LENGTH: 9 POINTS
NOISE LEVEL: NOISEFREE, 0.005, 0.01 pp (c) FILTER LENGTH: 11 POINTS
NOISE LEVEL: NOISEFREE, 0.005, 0.01 pp

FILTER LENGTH: 19, 21, 23, 25 POINTS
NOISE LEVEL: NOISEFREE

FILTER LENGTH: 19, 21, 23, 25 POINTS
NOISE LEVEL: 0.005pp

FILTER LENGTH: 19, 21, 23, 25 POINTS
NOISE LEVEL: 0.01 pp

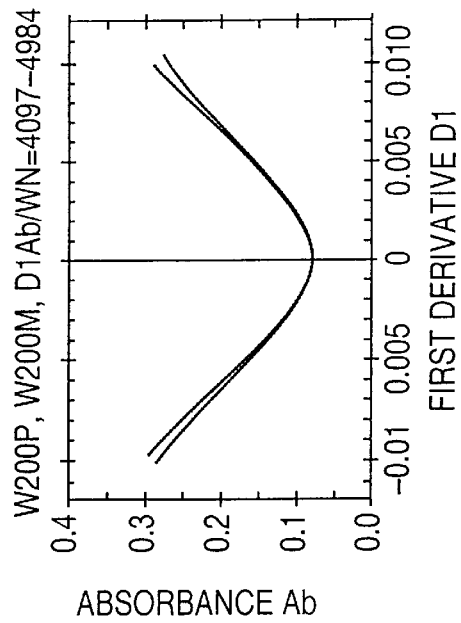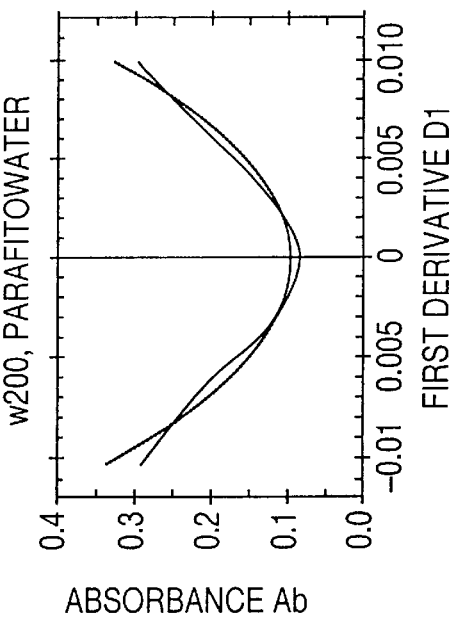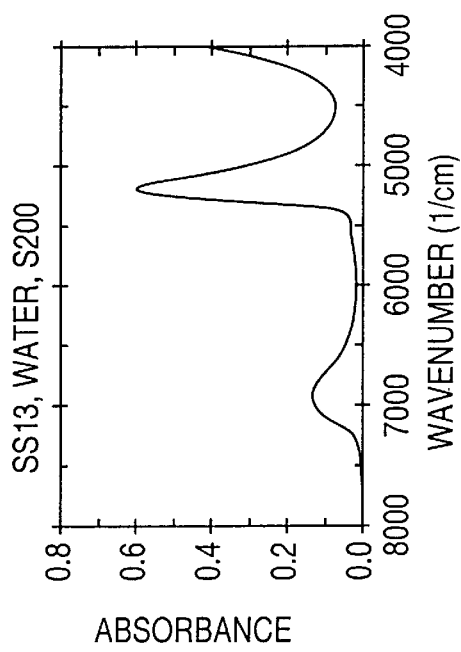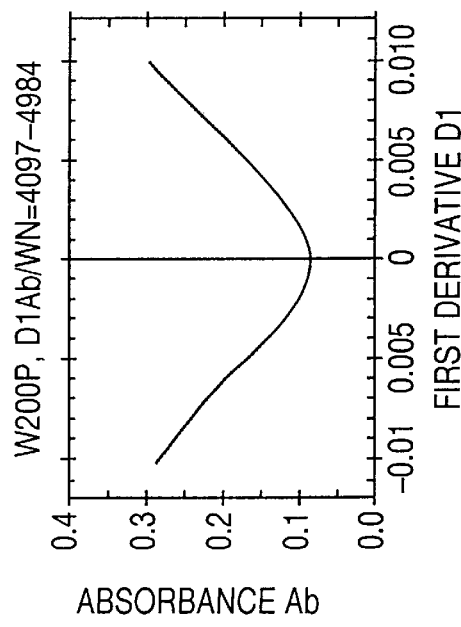

SS13, w400, w350, ..., w100

D1-LOG(1/ENERGY) PLOTTINGS
D1Ab/3900-5500; w400, 350, 300, ...

2-bromoPropane; BLC/SM15qc

2b-Propane; D2Ab/PRD

2b-Propane; BLC/PRD

2b-Propane; D2Ab/PRD/OFFSET

ORIGINAL SPECTRA
ORG; G10, G5, G3, G1, W1

DIFFERENCE SPECTRA
ORG; G10, G5, G3, G1-W1

EXTENDED ISO-WAVENUMBER LINES NEAR
EQUI-ABSORBANCE REGIONS 1,2

ORIGINAL
D1AB/WN=4027–5092/ORG; G10, G5, G3, G1,W1

AFTER CORRECTION OF BASELINES
D1AB/WL3C/PCX; G10, G5, G3, G1,W1

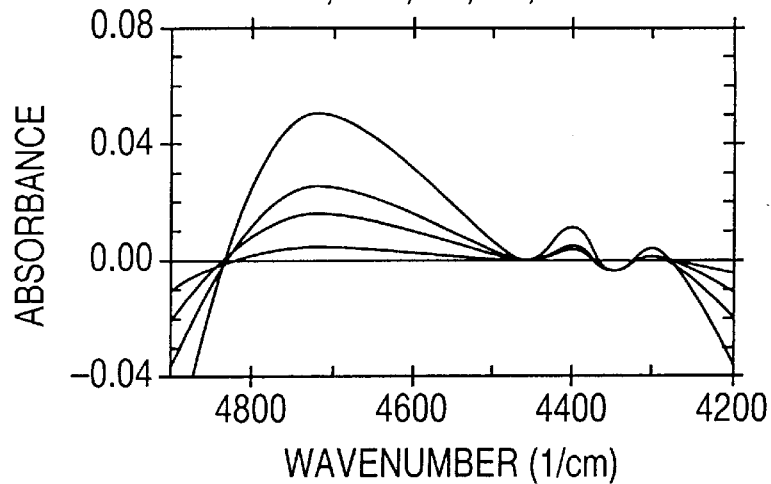
FIG. 43A ORIGINAL DIFFERENCE SPECTRA
ORG; G10, G5, G3, G1–W1
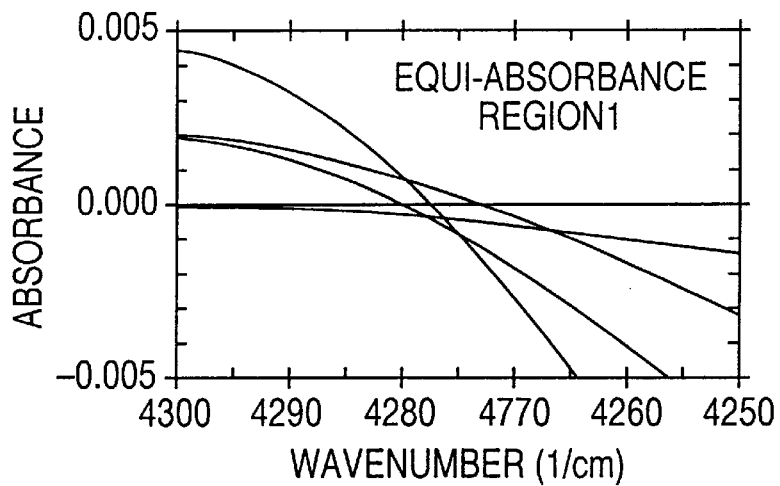
FIG. 43B ORG; G10, G5, G3, G1–W1
EQUI-ABSORBANCE REGION 1
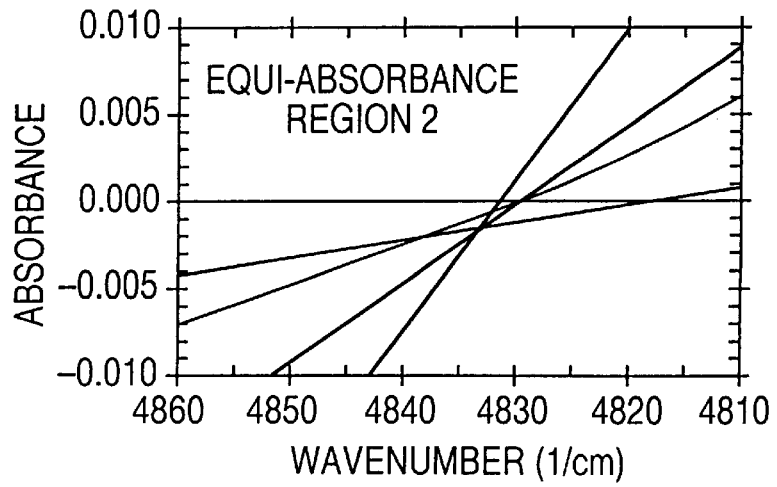
FIG. 43C ORG; G10, G5, G3, G1–W1
EQUI-ABSORBANCE REGION 2

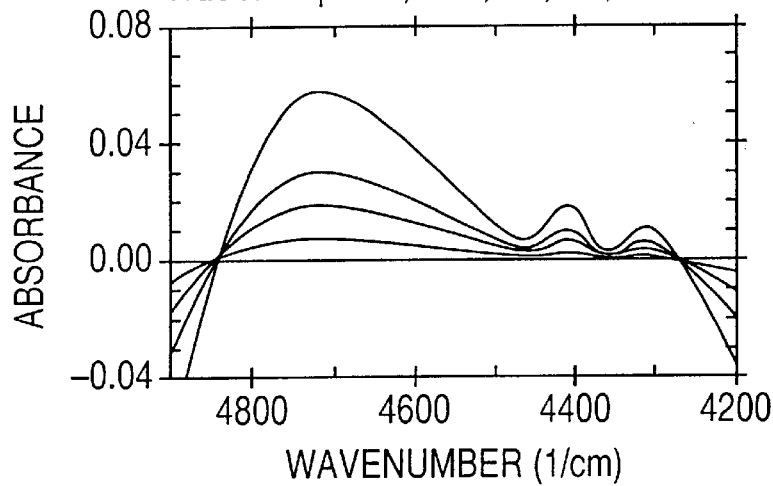
FIG. 44A CORRECTED DIFFERENCE SPECTRA WL3C/Dcq/PRD; G10, G5, G3, G1–W1
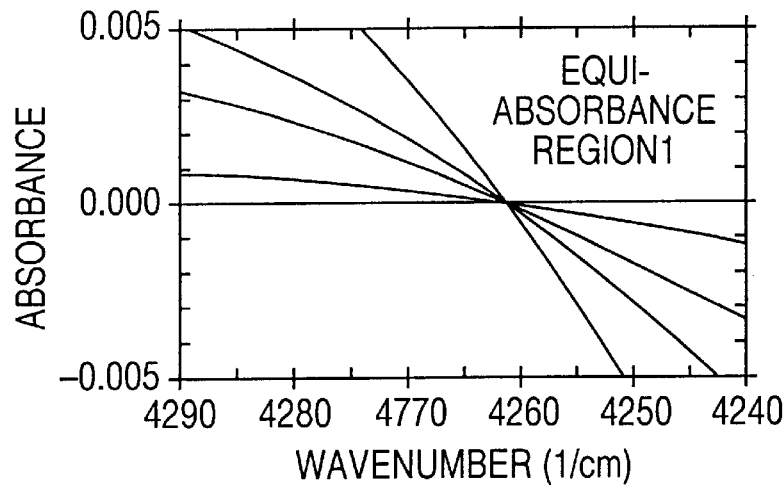
FIG. 44B 3WLC/Dcq; G10, G5, G3, G1–W1
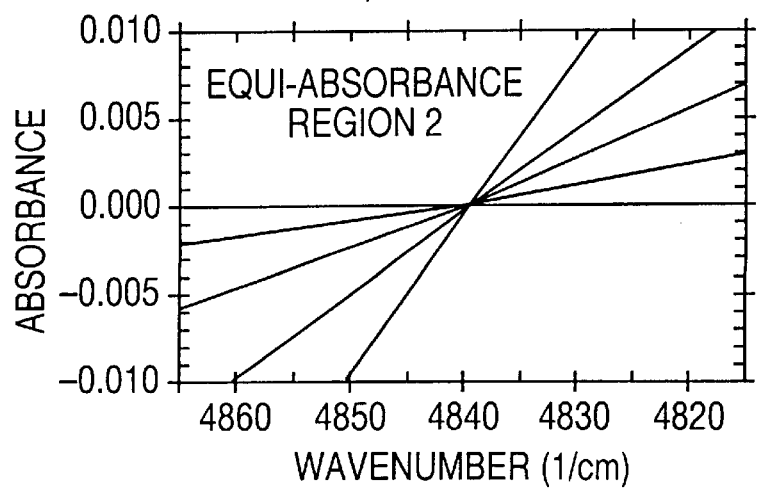
FIG. 44C 3WLC/Dcq; G10, G5, G3, G1–W1

PRIOR METHOD
WL5C/DDqd, G10, G5, G3, G1, W1

2D FITTING METHOD
WL5C/DDqd/PRD, G10, G5, G3, G1-W1

METHOD OF PROCESSING AND CORRECTING SPECTRAL DATA IN TWO-DIMENSIONAL REPRESENTATION

BACKGROUND OF THE INVENTION

1. Field of the Invention

The present invention relates to a method of processing spectral data in two-dimensional representation. The method gives accurate feature information about an analyzed object by applying differential operations to the processing of spectral data of the analyzed object in spectroscopic analysis. The present invention also relates to a method of correcting spectral data. The method equalizes or corrects the reference values or baselines for determination for the spectral data by the above processing method. The spectroscopic analysis includes Infrared, near-infrared, visible, or ultraviolet spectroscopic analysis, various chromatogram analysis, Raman spectroscopic analysis, electron ray or X-ray spectroscopic analysis, and the like.

2. Description of the Related Art

In general, spectroscopic analysis, for example, infrared absorbance spectroscopic analysis, measures the intensity spectrum of light transmitted through or absorbed by an object for analysis, called analyzed object hereafter, and obtains various scientific features or information, called feature information hereafter, about the analyzed object, based on the spectral form or spectral profile. As the spectral form, the absorbance for analyzed object expressed as a function of the wavenumber or wavelength, called absorbance-wavenumber spectral profile hereafter, has been widely used.

However, such conventional spectroscopic techniques that obtain various feature information based on the absorbance-wavenumber profile cannot accurately extract all feature information, although a great number of features are contained in spectral data. Therefore, there have been problems that the techniques cannot obtain much feature information about the analyzed object, and the accuracy is not much great, depending on the obtained feature information. Therefore, a processing technique or analytical technique for, spectral data is desired in order to obtain more feature information with greater accuracy.

Further, quantitative spectroscopic analysis requires the creation of a number of standard samples and the creation of a quantitative model from the spectral data of the standard samples. In this case, the spectral data of each standard sample is obtained by individual spectrometry. Measuring conditions, such as the conditions of the spectrometer and conditions of samples, in spectrometry vary, no matter how much care is taken. Therefore, the spectral data of standard samples contain deviations or errors due to such fluctuations in measuring conditions.

Specifically, there exists a base section that is noneffective for obtaining feature information, in an absorbance-wavenumber profile obtained from such spectral data. The boarder between the effective section for obtaining feature information and the non-effective section is called the reference (reference for determination) or baseline. The reference for determination or the baseline fluctuates with the drift of the spectrometer and the conditions of the sample. Therefore, in order to create a quantitative model from the absorbance-wavenumber profiles of standard samples, it is necessary to equalize or correct the references for determination or the baselines of the spectral profiles of the standard samples.

However, it is difficult for conventional spectroscopic techniques that uses absorbance-wavenumber spectral profiles to equalize or correct the references for determination or the baselines. In particular, if the standard samples are aqueous solutions, it is impossible to determine the baseline in an absorbance-wavenumber profile, so that the creation of the reference for determination or the baseline and the creation of a quantitative model is extremely difficult.

SUMMARY OF THE INVENTION

An object of the present invention is therefore to solve the above problems and to provide a means of obtaining more feature information about an analyzed object with greater accuracy from spectral data of the analyzed object. Another object of the present invention is to provide a means of equalizing or correcting the references for determination or the baselines of the spectral data.

In order to achieve the above objects, according to one aspect of the present invention, a method of processing spectral data in two-dimensional representation characterized in the following is provided. (a) Spectral data is prepared as an output signal of a spectrometer for a predetermined analyzed object such that the intensity of the signal is expressed as a function of time, the wavenumber, or wavelength. (b) Given two different positive integers $n_1$, $n_2$, the values of the $n_1$th derivative and $n_2$th derivative of the output signal intensity at a plurality of points on a spectral profile of the spectral data with respect to time, the wavenumber, or wavelength are calculated. (c) A two-dimensional derivative spectral profile of the spectral data is obtained by plotting the coordinates (u, v) consisting of the $n_1$th derivative value u and the $n_2$th derivative value v at the varying wavenumber in a two-dimensional coordinate space. (d) Desired feature information about the spectral data is obtained, based on the two-dimensional derivative spectral profile.

This method of processing spectral data is effective, for example, when the feature information is the degree of agreement or symmetry of the spectral profile in a predetermined time domain, wavenumber domain, or wavelength domain.

In the present method of processing spectral data, a derivative spectral profile is created based on the differential operations with respect to time, the wavenumber, or wavelength applied to the original spectral profile of the output signal intensity. Therefore, maximal (locally maximum) points, minimal (locally minimum) points, maximal or minimal slope points (inflection point) etc. are clearly expressed in the derivative spectral profile. Further, a superimposed unclear peak, an extremely small spectrum buried in a shoulder and the like in the original spectral profile can also be clearly expressed in the derivative spectral profile. Therefore, more feature information is obtained with greater accuracy from the original spectral data of the analyzed object.

Further, time, the wavenumber, or wavelength is a parameter in the two-dimensional derivative spectral profile, so that a shift in time, the wavenumber, or wavelength in the original spectral profile is cancelled out. Therefore, without a particular procedure of correcting the shift for a plurality of original spectral profiles, feature information about these profiles can be compared and evaluated independently of the shift.

Still further, in the two-dimensional derivative spectral profile, a reference for determination or the baseline is substantially eliminated without correcting it. Likewise, a low-frequency component can also be eliminated. Therefore, in quantitative spectroscopic analysis, a quantitative model is easily created from spectral data of standard samples.

In the above method of processing spectral data, $n_1$ and $n_2$ are preferably not more than 4. The use of derivatives of 5th order or more does not only complicate the calculation but also makes effects of noise conspicuous, so that its practicality is not much high.

In the above method of processing spectral data, each of the $n_1$th and $n_2$th derivatives can be obtained by repeating numerical differentiation by the order of the derivative. The numerical differentiation can be performed by first obtaining an approximating quadratic polynomial for each abscissa x of data points by least-squares curve fitting from the data points of a predetermined size of an interval containing x. Then the obtained quadratic polynomial is differentiated at x to obtain the derivative value y' at x. Through this procedure of numerical differentiation, a two-dimensional derivative spectral profile can be obtained with least effects of noise.

Alternatively, each of the $n_1$th and $n_2$th derivatives can be obtained by repeating numerical differentiation by the order of the derivative, by using an approximating cubic or quartic polynomial in place of the approximating quadratic polynomial in the above procedure.

In the above method of processing spectral data, a two-dimensional derivative spectral profile is preferably created for each of Ea plurality of analyzed objects and displayed in the same two-dimensional coordinate space. Then feature information about the spectral data is obtained by adding straight lines that connect each pair of points corresponding to the same time, wavenumber, or wavelength in the derivative spectral profiles. This processing method is effective, for example, in the case where the feature information is linearity of the spectrometer that collects the spectral data.

In this case, if it is predicted, from properties of the analyzed objects, that all points corresponding to the same time, wavenumber, or wavelength are on a single straight line, then the straight line can be determined by the method of least squares, and the spectral data can be corrected so that the points corresponding to the same time, wavenumber, or wavelength should be on the straight line. In this way, errors on the spectral data can be eliminated, so that two-dimensional derivative spectral profiles can be obtained with greater accuracy.

According to another aspect of the present invention, there is provided a method of correcting spectral data in two-dimensional representation such that the references for determination or the baselines are corrected by using some feature information obtained by the method of processing spectral data in two-dimensional representation described above. According to this method of correcting spectral data, the references for determination or the baselines for different analyzed objects can be easily equalized or corrected.

In the above method of processing spectral data in two-dimensional representation, $n_1$th and $n_2$th derivative values can be calculated by using optimal parameters for numerical differentiation. In this case, the optimal parameters can be determined by some feature information obtained by the above method of processing spectral data.

According to another aspect of the present invention, there is provided a method of processing spectral data in two-dimensional representation characterized in that the references for determination or the baselines are corrected by using some feature information obtained by the method of processing spectral data in two-dimensional representation, any two-dimensional derivative spectral profiles are created from the corrected spectral data.

BRIEF DESCRIPTION OF THE DRAWINGS

These and other objects and features of the present invention will become clear from the following description taken in conjunction with the embodiments thereof with reference to the accompanying drawings, in which:

FIGS. 33A to 33D respectively show an absorbance spectrum of water and three kinds of its D1–D0 plotting;

FIGS. 43A to 43C respectively show the difference spectra before correction and their enlarged graphs in two equi-absorbance regions;

FIGS. 44A to 44C respectively show the difference spectra after correction and their enlarged graphs in two equi-absorbance regions;

DETAILED DESCRIPTION OF THE PREFERRED EMBODIMENTS

Figure 1:
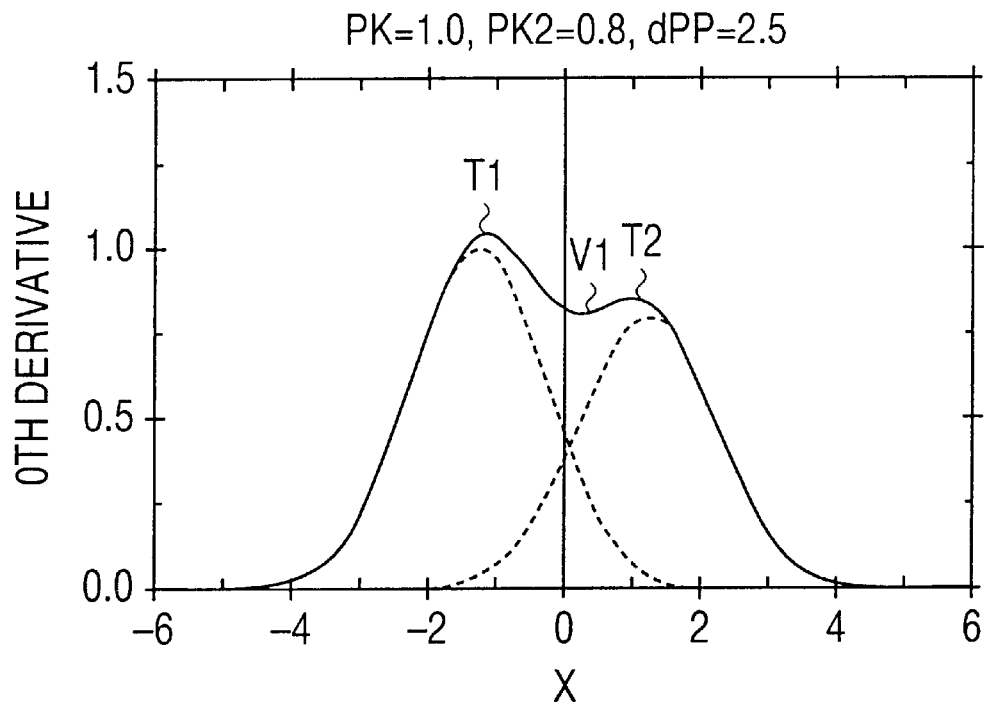
FIG. 1 shows an original model spectrum without any baseline.

The preferred embodiments according to the present invention will be described below with reference to the attached drawings.

Outline of Processing Spectral Data in Two-Dimensional Representation and correcting baselines.

A profile of spectral data contains a great amount of feature information explicitly or implicitly. It is one of the research tasks in spectroscopy to solve the problem of how to extract, clarify, and contract desired feature information. If the profile of spectral data is represented more rationally, then the analysis of the spectral data, such as extracting, comparing, and correcting feature information, becomes easier and more accurate. In general, characteristics of a function or curve can be grasped more accurately by differentiation. Determination and extraction of variation, convexity or concavity, extrema, inflection points can be easily performed by means of differentiation. Differentiation is a powerful means for profile analysis Of spectral data.

The present invention is concerned with graphical techniques of extracting features in two-dimensional spectral profiles. The foundations and applications of the graphical techniques are described in the following. Essential properties of spectral data can be intuitively grasped in a graphical representation. Further, basic processing or procedures, such as the extension, contraction, displacement, deformation, and revision of the representation are easy. Also, an increase in the number of dimensions of the representation makes the mathematical procedures more colorful.

Action and Effects of Differentiation.

A derivative spectrum is a function of the wavenumber or wavelength, simply called wavenumber hereafter, obtained by differentiating an absorbance spectrum or intensity, simply called absorbance spectrum hereafter, with respect to the wavenumber. The nth derivative of an absorbance spectrum is called the nth'derivative spectrum hereafter. Bit differentiating an absorbance spectrum, feature points, such as maximal points, minimal points, maximal or minimal slope points (inflection points) etc. are clearly detected, and a superimposed unclear peak, an extremely small spectrum buried in a shoulder and the like in the original spectral profile can also be clarified. If the performance of extracting the details of spectral profiles is enhanced, then the distinguishing of closely similar spectra and the tracing of a subtle variation of a spectrum become possible. Besides the extraction of feature points, differentiation also contributes to the correction of a shift in the baseline. For example, the offset of a baseline can be eliminated by the first derivative. The slope of a baseline is also eliminated by the second derivative. Further, differentiation has the action and effects of eliminating or reducing low-frequency components.

Features of Curves.

As describe above, various features of a function or curve can be grasped by differentiation. For example, determination and extraction of variation, convexity or concavity, extrema, inflection points can be easily performed by means of differentiation.

Determination and extraction of extrema (peaks, and troughs) and extremal slope points (inflection points) have been conventionally performed by following the test conditions formulated by the equations (1a), (1b) or (2a), (2b) and the equations (3a), (3b) and by using a variation table as illustrated by Table 1.

<Test conditions for extrema 1>

If $f'(a)=0$ and $f''(a)<0$, then $f$ is maximal at $x=a$. (1a)

If $f'(a)=0$ and $f''(a)>0$, then $f$ is minimal at $x=a$. (1b)

<Test conditions for extrema 2>

If $f'(a)=0$ and, at a neighborhood of $x=a$, $f(x)>0$ for $x<a$ and $f(x)<0$ for $x>a$, then $f$ is maximal at $x=a$. (2a)

If $f'(a)=0$ and, at a neighborhood of $x=a$, $f(x)<0$ for $x<a$ and $f(x)>0$ for $x>a$, then $f$ is maximal at $x=a$. (2b)

<Test conditions for inflection points>

If $f''(a)=0$ and $f(a)<0$, then $f$ has a falling inflection point at $x=a$. (3a)

If $f''(a)=0$ and $f(a)>0$, then $f$ has a rising inflection point at $x=a$. (3b)

FIG. 1 shows a graph of a bimodal function defined by the following equation (4) obtained by combining two Gaussian functions. Taking the graph of FIG. 1 as an original model spectrum (absorbance-wavenurmber spectrum),

TABLE 1

|  | P1 | T1 | P2 | V1 | P3 | T2 | P4 |
|---|---|---|---|---|---|---|---|
| Sign (f') | + | 0 | − | 0 | + | 0 | − |
| Sign (f") | 0 | − | 0 | + | 0 | − | 0 |
| Features | Inflection point | Peak | Inflection point | Trough | Inflection point | Peak | Inflection point |
| Changes | ↗ | Max | ↘ | Min | ↗ | Max | ↘ |
| x | −2.23311 | −1.13922 | −0.51880 | 0.25434 | 0.65130 | 1.03534 | 2.22296 |
| f (x) | 0.61863 | 1.03996 | 0.93283 | 0.80987 | 0.83281 | 0.85521 | 0.50075 | features of the curve are described in the following.

$$f(x)=\exp\{-(x+1.25)^2/2\sigma^2\}+0.8\exp\{-(x-1.25)^2/2\sigma^2\}, \quad (4)$$

where $\sigma=1$.

Figure 2:
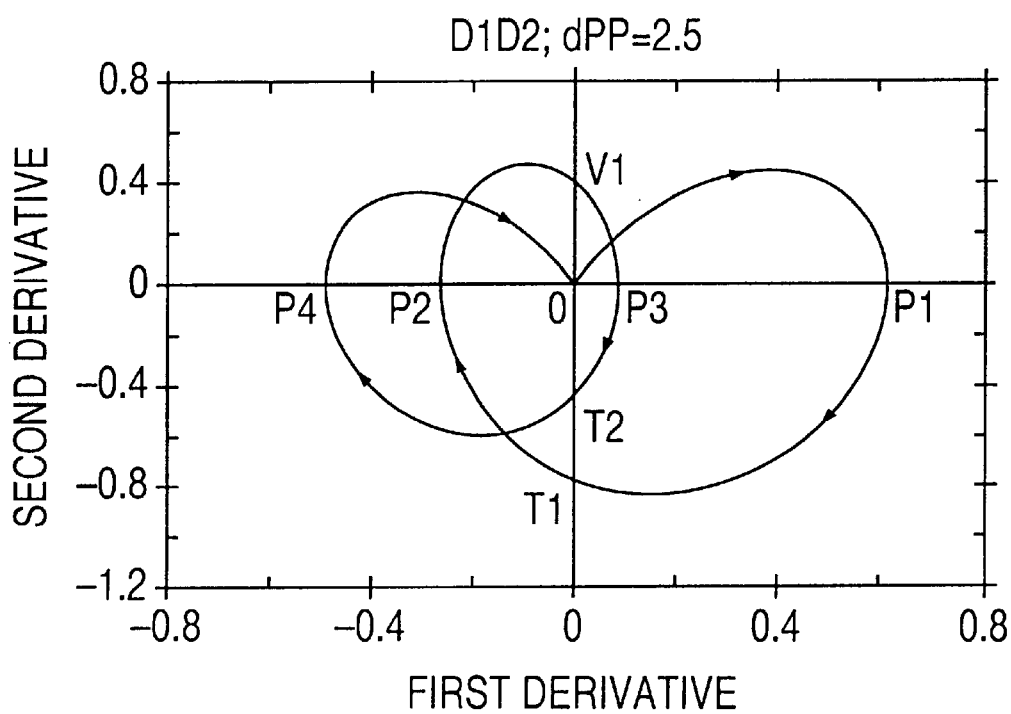
FIG. 2 shows a D1–D2 plotting for the original spectrum shown in FIG. 1.

First, a 2-dimensional representation for the first-order derivative D1 and the second derivative D2 of the original model spectrum is described in the following. The pair of the D1 value and D2 value at a wavenumber is plotted respectively as the abscissa or u-coordinate and the ordinate or v-coordinate of a point. The points obtained in this way, corresponding to wavenumbers, are successively connected by straight line segments in the order of their corresponding increasing wavenumbers. Then a locus in the two-dimensional coordinate space, called D1–D2 plotting hereafter, as shown in FIG. 2 is obtained. An intersection of the locus with the v-axis is an extremal point. If the ordinate of the intersection is negative, then the intersection corresponds to a maximal point (T1, T2); if the ordinate is positive, then the intersection corresponds to a minimal point (V1). On the other hand, an intersection of the locus with the u-axis corresponds to an inflection point (P1, P2, P3, P4).

As the value of the wavenumber increases, the locus in the two-dimensional plotting shown in FIG. 2 starts from the origin O, passes the first quadrant, crosses the u-axis at a point corresponding to the rising inflection point P1, and enters the fourth quadrant. Then the locus crosses the v-axis at a point corresponding to the maximal point T1, and enters the third quadrant. In this way, the locus further passes through points corresponding to the feature points p2, VI, P3, T2, P4 and finally returns to the origin O.

Spectral data obtained in practice is not continuous but digitized with some sampling interval or data interval. Therefore, for example, a point at which the second derivative becomes 0 is not necessarily a data point. Therefore, an adjacent data pair $(x_1, f(x_1))$ and $(x_2, f(x_2))$ that satisfies the following inequality (5) must be obtained by testing all the data pairs.

$$f''(x_1) \cdot f''(x_2) \leq 0. \quad (5)$$

Therefore, it is tedious to create a variation table as shown in Table 1 for digitized data, and errors can occur.

On the other hand, in a D1–D2 plotting for the present invention, the locus is graphically described clockwise, so that understanding is easy and errors rarely occur. Further the feature points can be quantitatively described. Also, the subtle shape of the profile can be grasped. In particular, the the equation (6) are eliminated in the D3–D4 plottings. In this way, differentiation has an effect of eliminating baselines.

Classes of 2D Plotting.

The classes of 2D plotting are described in the

TABLE 2

|  | B1 | P1 | T1 | P2 | V1 | P3 | T2 | P4 | B2 |
|---|---|---|---|---|---|---|---|---|---|
| Sign (f') | 0 | + | 0 | − | 0 | + | 0 | − | 0 |
| Sign (f'') | + | 0 | − | 0 | + | 0 | − | 0 | + |
| Features | Minmal | Inflection point | Peak | Inflection point | Trough | Inflection point | Peak | Inflection point | Minimal |
| Changes | Min | ↗ | Max | ↘ | Min | ↗ | Max | ↘ | Min |
| x | −4.7328 | −2.22801 | −1.12174 | −0.52311 | 0.20353 | 0.65610 | 1.09312 | 2.21645 | 4.05130 |
| f (x) | 0.07486 | 0.69209 | 1.12119 | 1.02430 | 0.91460 | 0.94764 | 0.97990 | 0.66302 | 0.24608 |

2D plotting for the present invention can be used as an algorithm for detecting peaks with great reliability.

Figure 3:
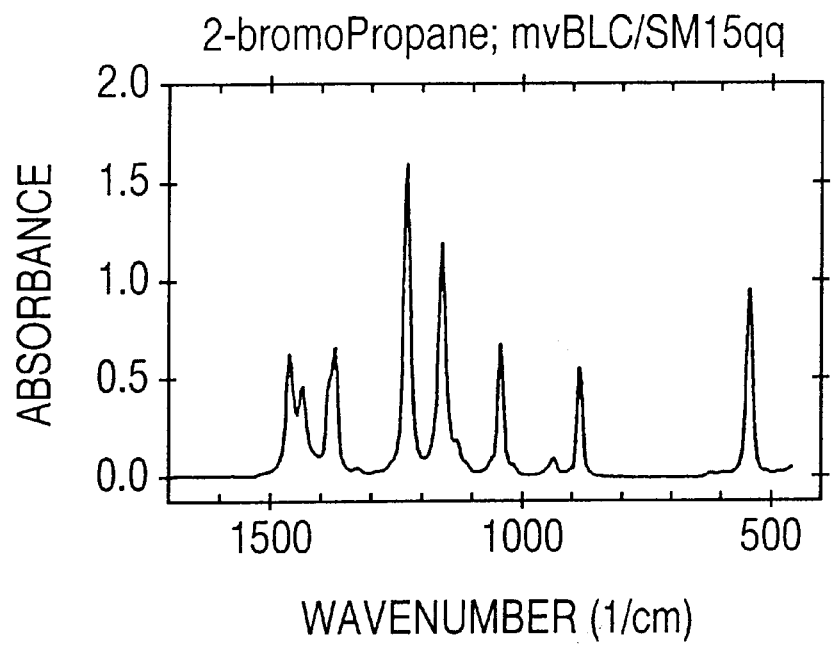
FIG. 3 shows an absorbance spectrum having multiple peaks.
Figure 4:
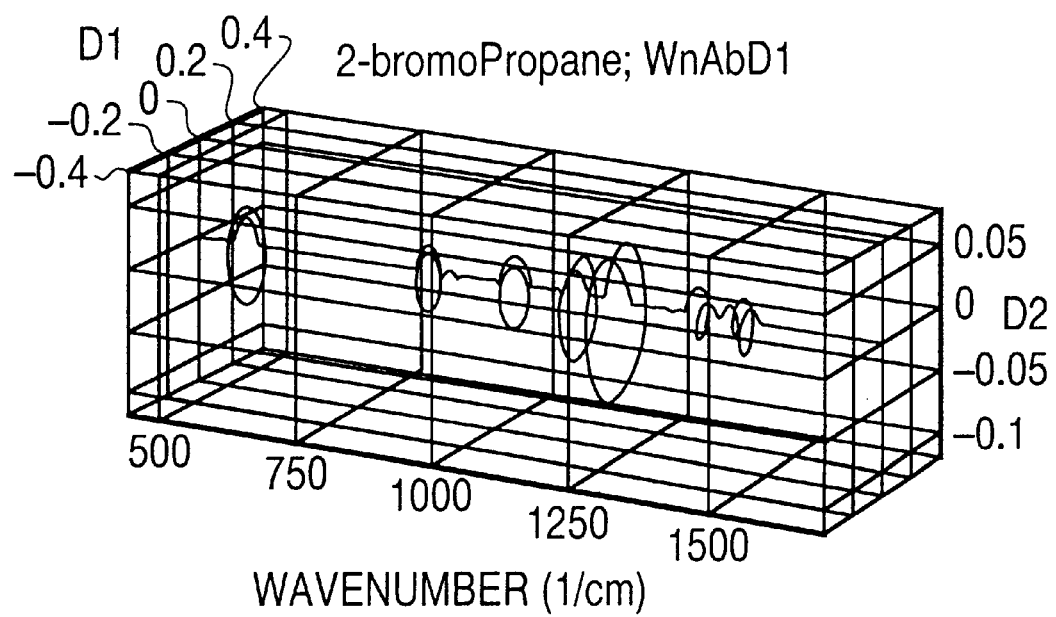
FIG. 4 shows a 3-dimensional profile of the derivative spectrum of the absorbance spectrum of FIG. 3.

In order to grasp a whole image on a wide range of wavenumbers for an absorbance spectrum that has multiple peaks as shown in FIG. 3, a three-dimensional representation with the third dimension of the wavenumber (wavelength) can be used, as shown in FIG. 4.

Figure 5:
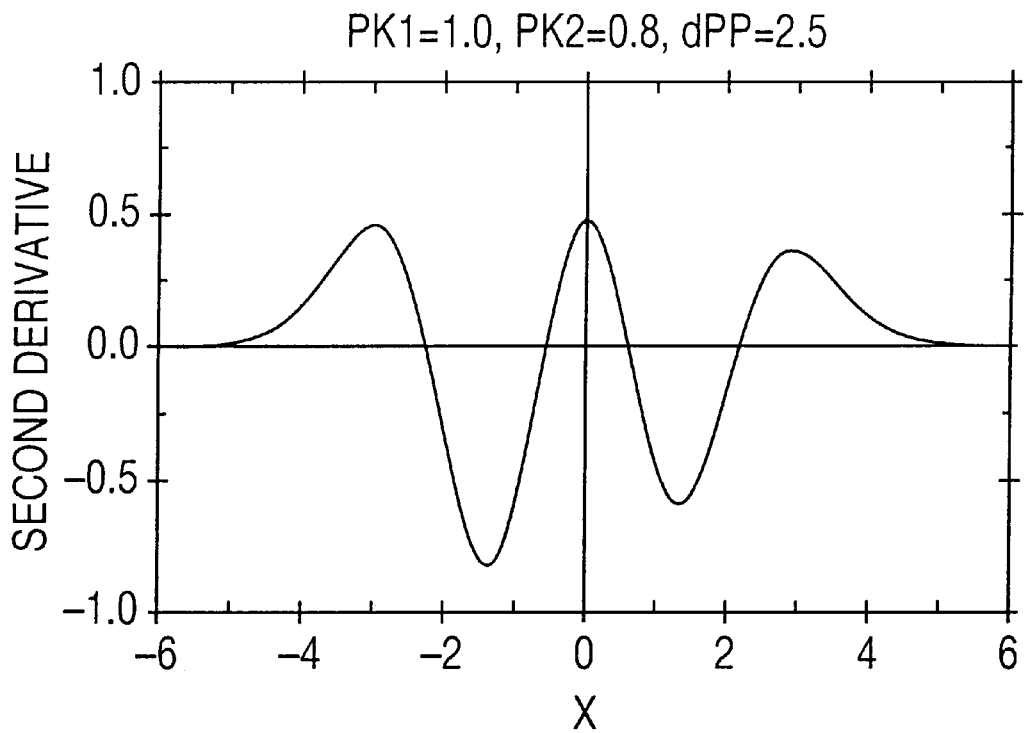
FIG. 5 shows the second derivative spectrum of the original model spectrum of FIG. 1.
Figure 6:
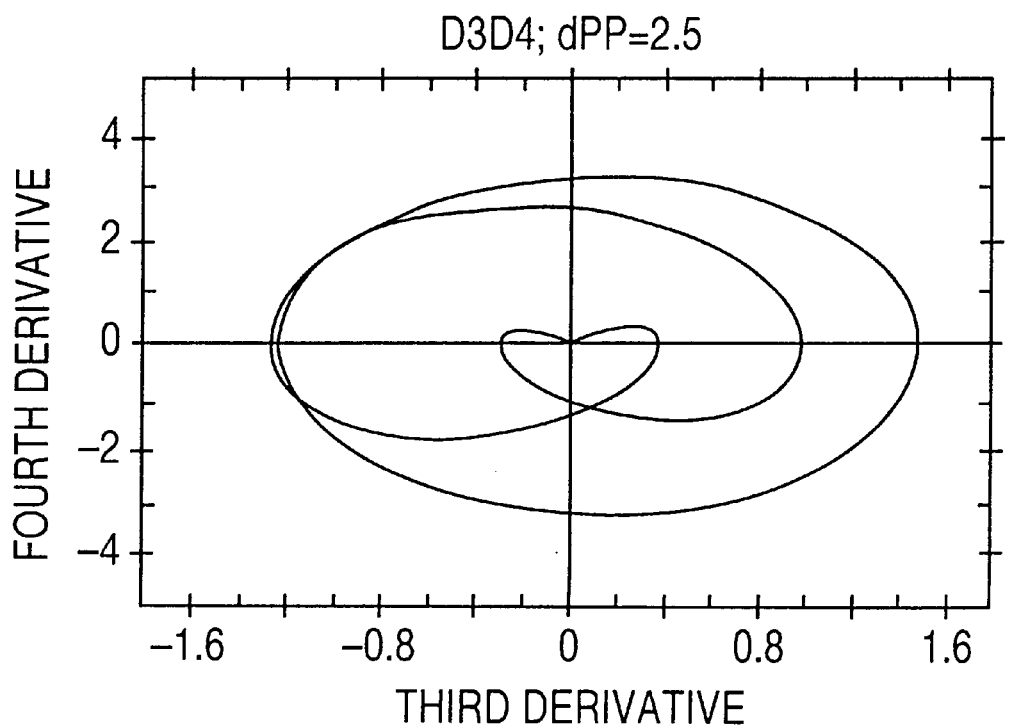
FIG. 6 shows a D3–D4 plotting for the original model spectrum of FIG. 1.

If the original model spectrum of FIG. 1 is differentiated twice with respect to the wavenumber x, then the second derivative as shown in FIG. 5 is obtained. If the second derivative is further differentiated with respect to the wavenumber x, then the third and fourth derivatives D3, D4 are obtained. The pair of the D3 value and D4 value at a wavenumber is plotted as the abscissa and ordinate of a point. The points obtained in this way, corresponding to wavenumbers, are successively connected by straight line segments in the order of their corresponding increasing wavenumbers. Then a locus in the two-dimensional coordinate space, called D3–D4 plotting hereafter, as shown in FIG. 6 is obtained. More feature points are shown in the D3–D4 plotting shown in FIG. 6 than in the D1–D2 plotting shown in FIG. 2.

Baseline of Quadratic Curve.

The case where a baseline is accompanied with an original spectrum is described in the following.

Figure 7:
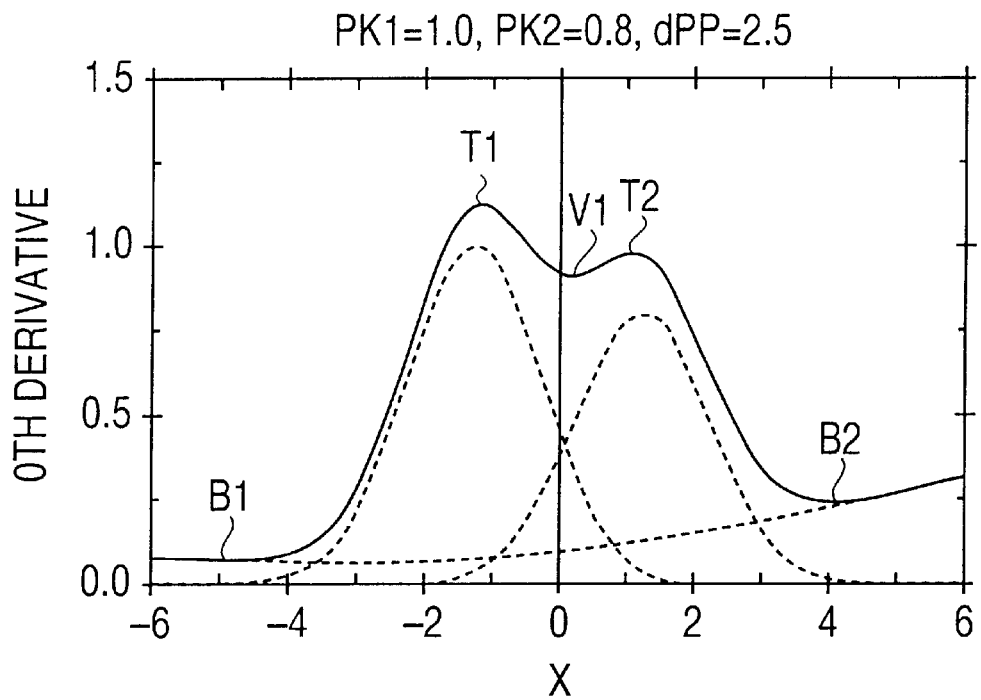
FIG. 7 shows an original model spectrum having a baseline.

FIG. 7 shows an original model spectrum obtained by adding a quadratic curve g(x) defined by the following equation (6) to the original model spectrum shown in FIG. 1.

$$g(x)=a+bx+cx^2, \quad (6)$$

where a=0.1, b=0.02, c=0.003.

Therefore, the original spectrum shown in FIG. 7 has a graph of the function h(x) defined by the following equation (7). Table 2 is a variation table of the function h(x).

$$h(x)=f(x)+g(x). \quad (7)$$

Figure 8:
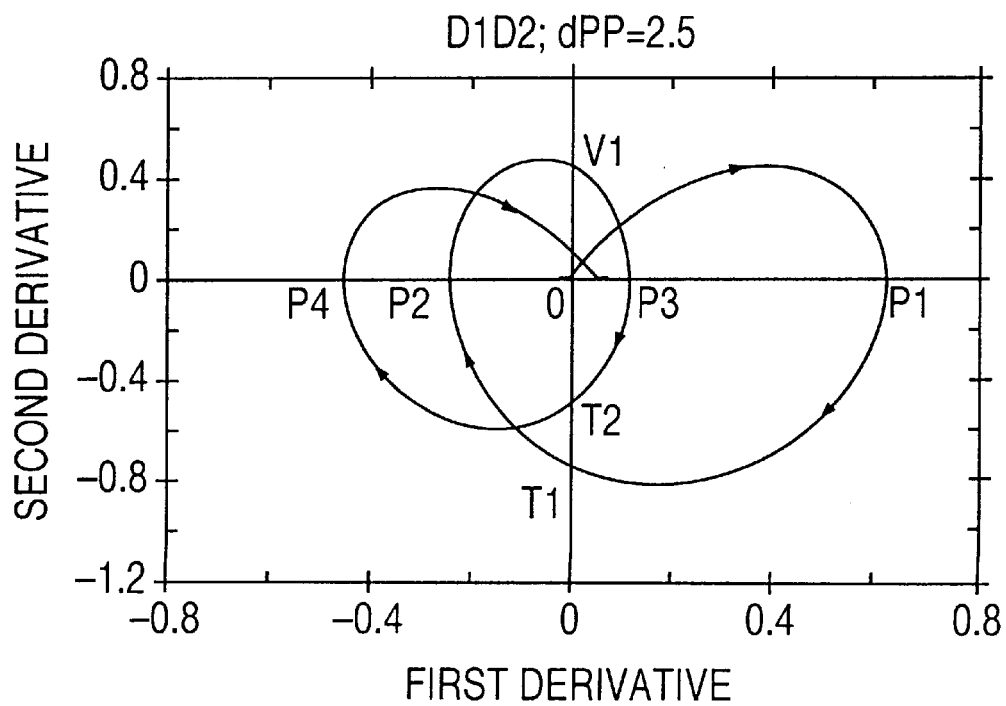
FIG. 8 shows a D1–D2 plotting for the original model spectrum of FIG. 7.
Figure 9:
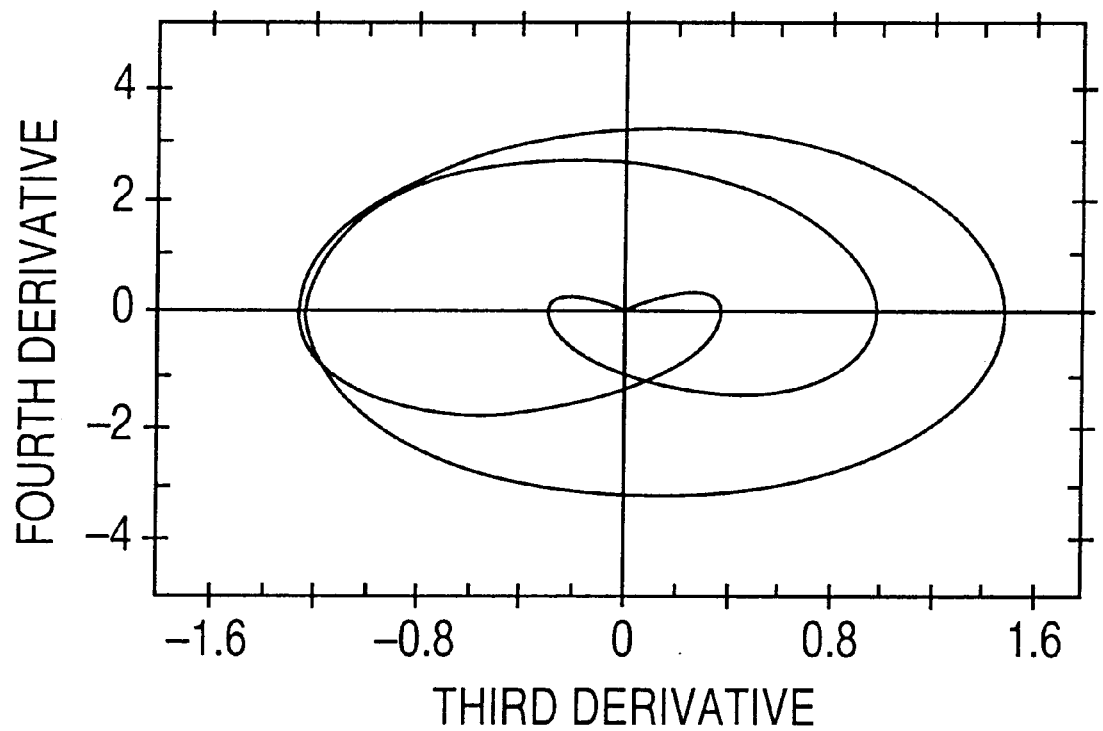
FIG. 9 shows a D3–D4 plotting for the original model spectrum of FIG. 7.

FIGS. 8 and 9 respectively show a D1–D2 plotting and a D3–D4 plotting for the original model spectrum of FIG. 7 having a baseline. As clearly seen from FIGS. 2 and 8, which are D1–D2 plottings, the D1–D2 plottings for the functions defined by the equations (4) and (7) are different from each other. However, as clearly seen from FIGS. 6 and 9, which are D3–D4 plottings, the D3–D4 plottings for the functions defined by the equations (4) and (7) are the same. That is, the effects of the baseline of the quadratic curve g(x) defined by following. When an original spectrum is differentiated, it is practical that the order of the differentiation is less than five. If the original spectrum is differentiated up to the fifth order, then 2D representations D1–D0, D2–D0, D3–D0, D4–D0, D1–D2, D2–D3, D3–D4, and D2–D4 plottings are considered to have practical use, although it is not impossible to use D1–D3 or D1–D4 plottings.

In order to ease understanding, properties of various 2D plottings are described in the following, using a plurality of Gaussian unimodal functions having different heights as original model spectra. That is, the Gaussian functions defined by the following equation (8) are considered as spectra for simulation.

$$f(x)=k \cdot \exp(-x^2/2\sigma^2), \quad (8)$$

where k=1, 0.8, 0.6, 0.4 are the heights of the peaks. Also, the data interval is 0.02σ.

FIGS. 10A to 10D respectively show the original model spectra of the unimodal functions defined by the equation (8) and their first derivative spectra, second derivative spectra, and fourth derivative spectra. Here, the first derivative spectra are obtained by least-squares curve fitting for approximating cubic or quartic polynomials that uses 13 data points for each approximating polynomial, and higher order derivative spectra are obtained by a multipass that repeats the process for obtaining the first derivative.

FIGS. 11A to 11H respectively show D1–D0, D2–D0, D3–D0, D4–D0, D1–D2, D2–D3, D3–D4, D2–D4 plottings obtained from the original model spectra and their derivative spectra shown in FIGS. 10A to 10D.

In the 2D plottings shown in FIGS. 11A to 11H, there appear unique characteristics depending on the combinations of derivative spectra. For example, the D1–D0 plottings are a balloon type. In the D2–D0 plottings, the left halves and right halves of the loci completely overlap. Therefore, the peaks of the unimodal original spectra have complete symmetry. Also, the D1–D2 plottings are a heart type.

From these results, it is seen that the symmetry of a peak can be easily determined from the D2–D0 plotting or the D4–D0 plotting. Since the first derivative expresses the slope of the original model spectrum, the symmetry of a peak is more clearly grasped by reversing the sign of the first derivative to describe the locus.

Further, the correction of the baseline and background car be performed by using the 2D plotting for a derivative spectrum. Specifically, the first derivative spectrum can eliminate the offset of the baseline. The second derivative spectrum can eliminate the slope of the baseline. Further, derivative processing can eliminate or reduce low-frequency components.

2D Plotting and Iso-Wavenumber Lines.

Figure 10A:
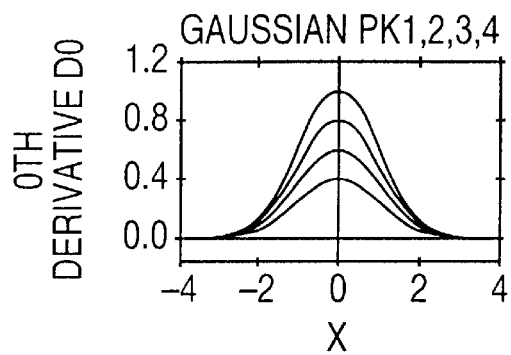
FIGS. 10A to 10D respectively show original model spectra defined by unimodal functions and their first to fourth derivative spectra.
Figure 10B:
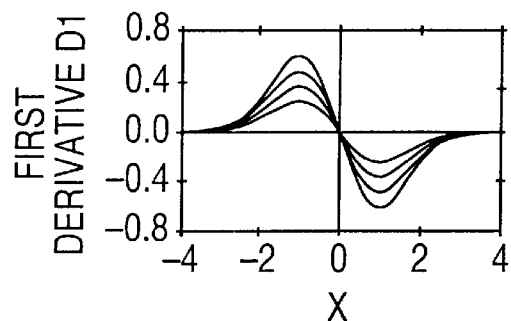
Figure 10C:
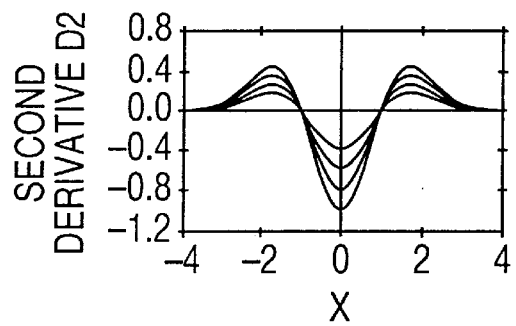
Figure 10D:
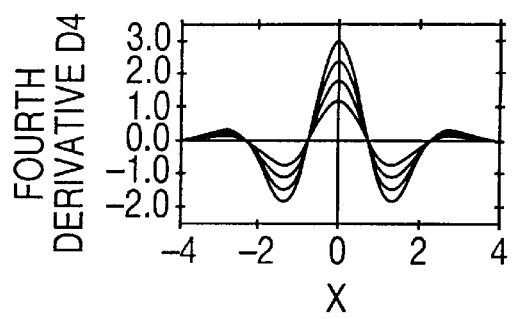
Figure 11A:
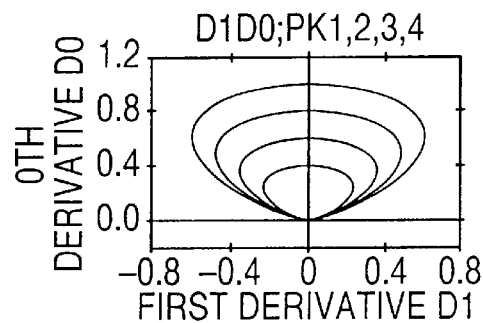
FIGS. 11A to 11H respectively show 2D plottings created from the original model spectra and their derivative spectra shown in FIGS. 10A to 10D.
Figure 11B:
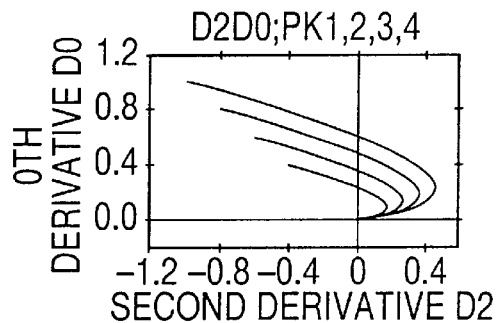
Figure 11C:
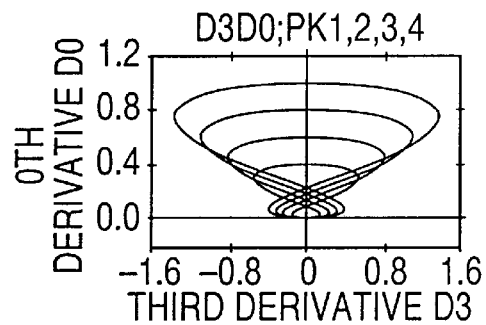
Figure 11D:
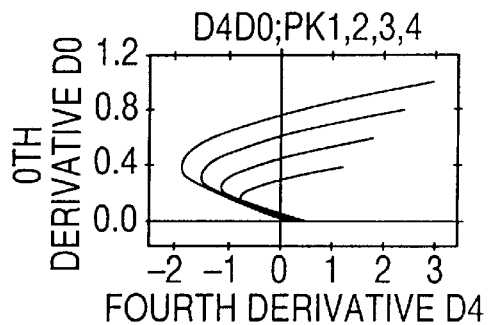
Figure 11E:
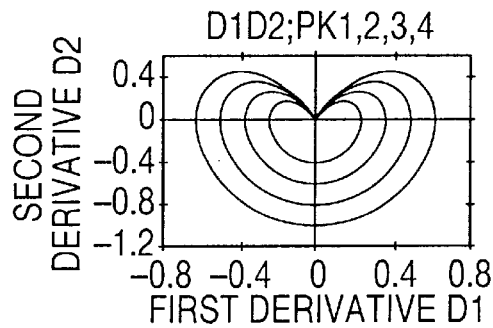
Figure 11F:
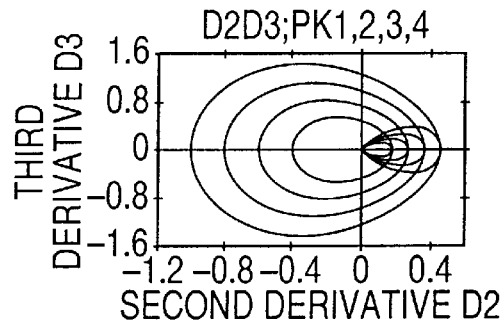
Figure 11G:
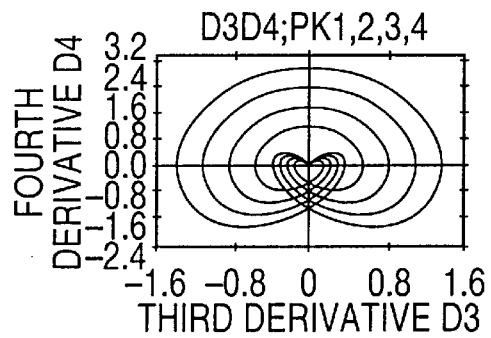
Figure 11H:
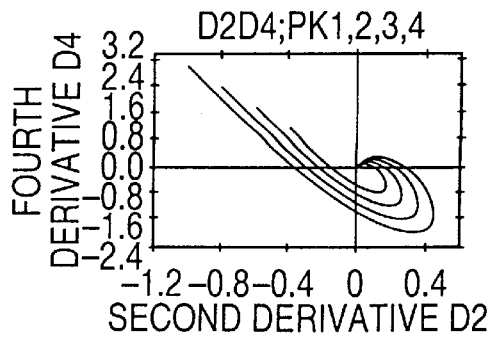
Figure 12A:
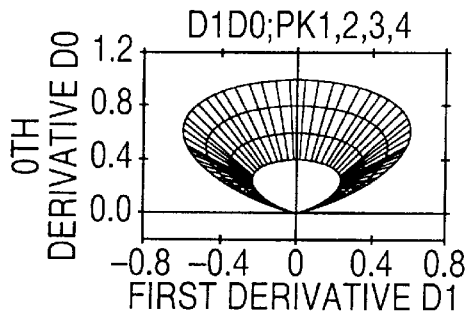
FIGS. 12A to 12H respectively show equi-wavenumber lines drawn in the 2D plottings of FIGS. 11A to 11H.
Figure 12B:
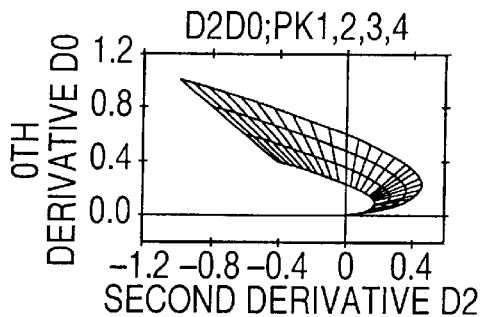
Figure 12C:
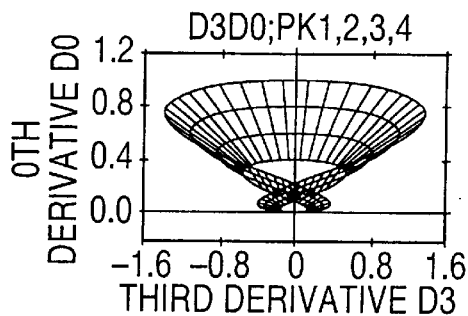
Figure 12D:
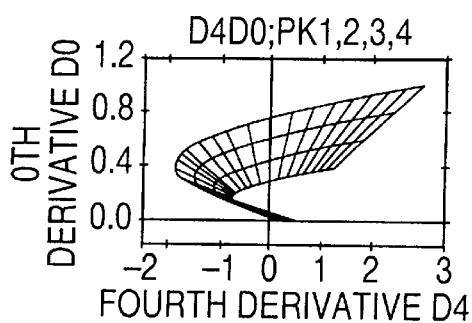
Figure 12E:
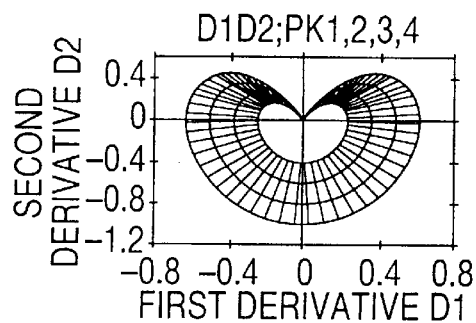
Figure 12F:
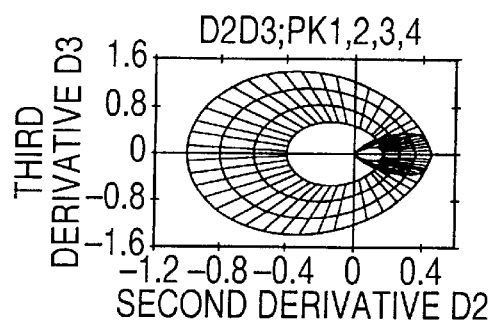
Figure 12G:
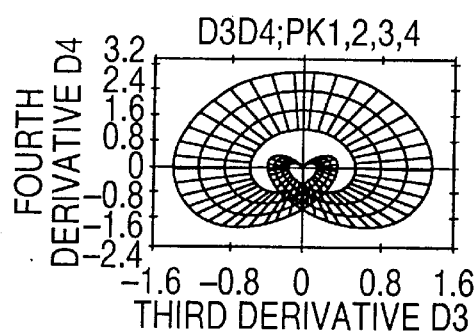
Figure 12H:
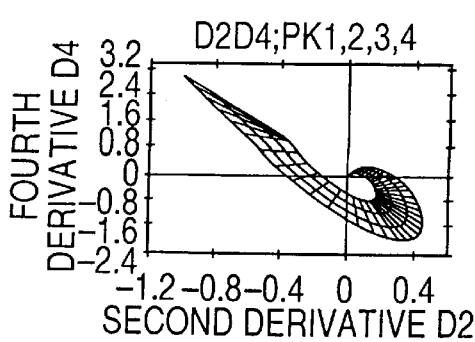
Figure 13A:
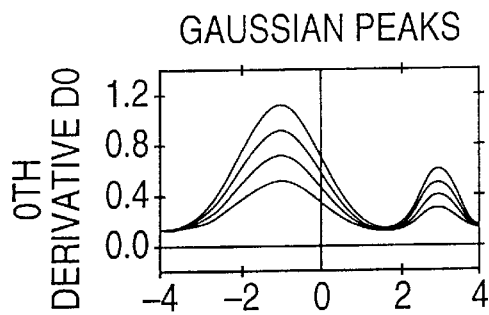
FIGS. 13A to 13E respectively show original model spectra defined by bimodal functions and their first to fourth derivative spectra obtained by differentiation for continuous functions.
Figure 13B:
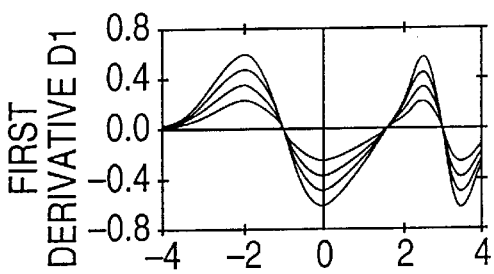
Figure 13C:
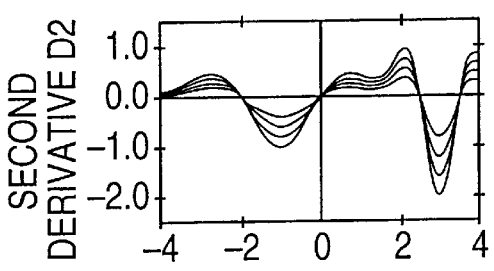
Figure 13D:
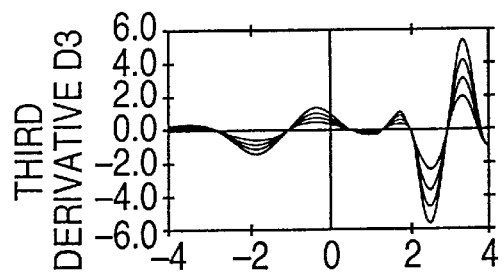
Figure 13E:
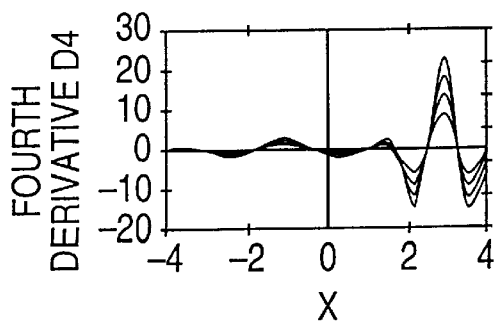
Figure 14A:
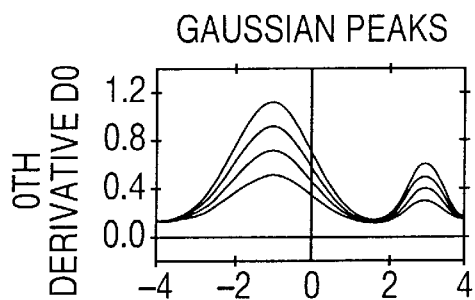
FIGS. 14A to 14E respectively show original model spectra defined by adding a noise function to the model spectra of FIG. 13A and their first to fourth derivative spectra obtained by numerical differentiation through least-squares curve fitting for approximating quadratic polynomials.
Figure 14B:
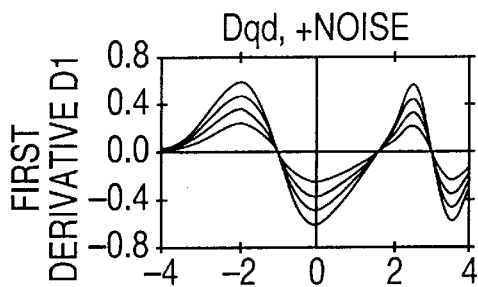
Figure 14C:
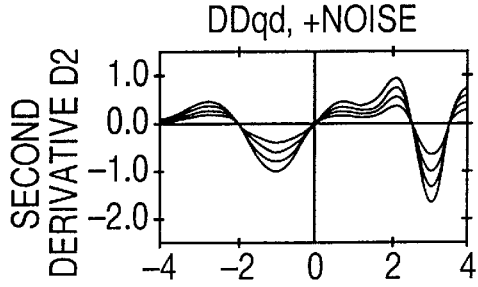
Figure 14D:
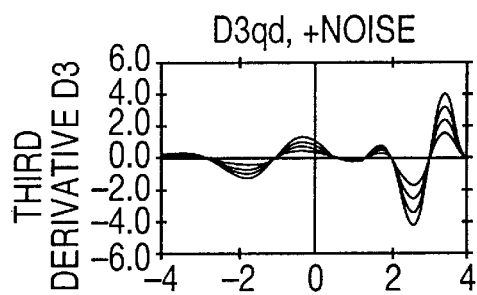
Figure 14E:
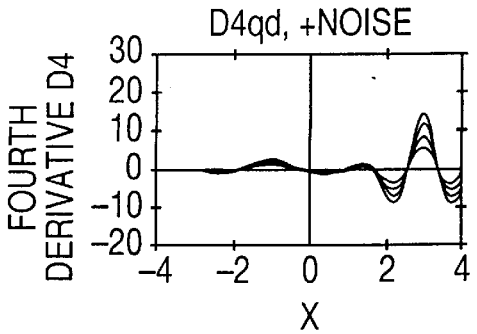
Figure 15A:
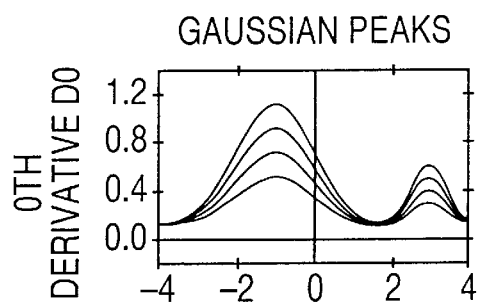
FIGS. 15A to 15E respectively show original model spectra of FIG. 14A and their first to fourth derivative spectra obtained by numerical differentiation through least-squares curve fitting for approximating cubic, or quartic polynomials.
Figure 15B:
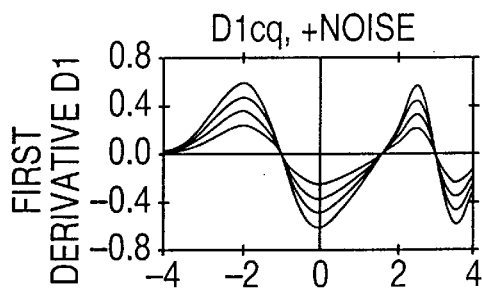
Figure 15C:
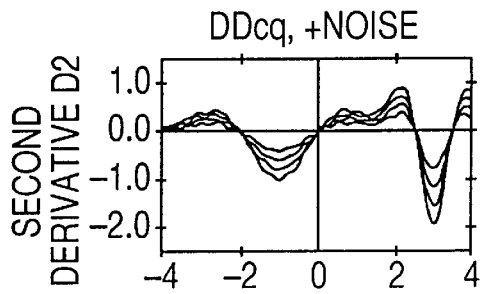
Figure 15D:
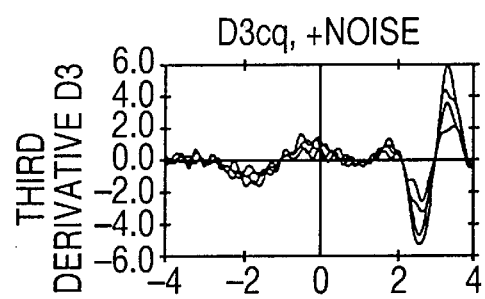
Figure 15E:
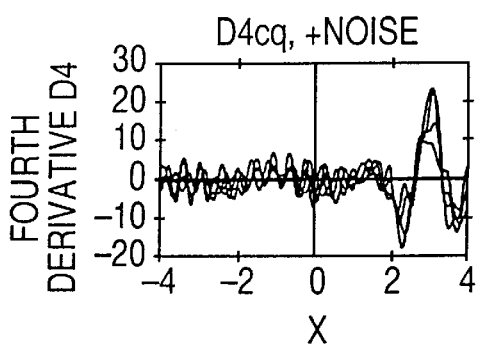
Figure 16A:
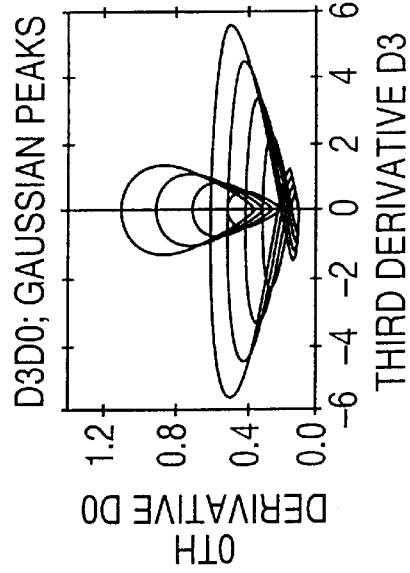
FIGS. 16A to 16D respectively show D1–D0, D2–D0, D3–D0, and D4–D0 plottings obtained from the original model spectra and their derivative spectra shown in FIGS. 13A to 13E.
Figure 16C:
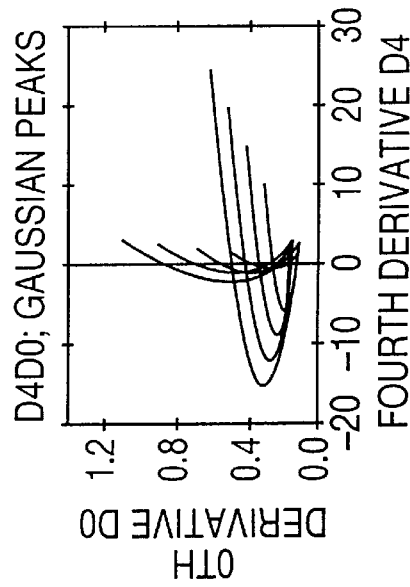
Figure 16B:
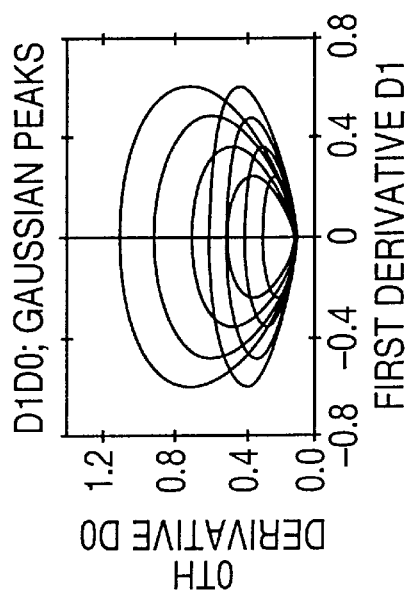
Figure 16D:
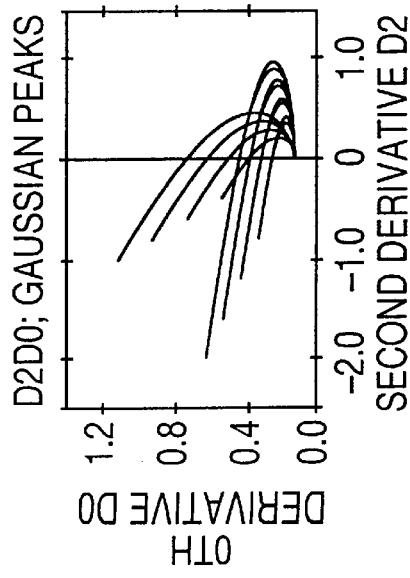
Figure 17A:
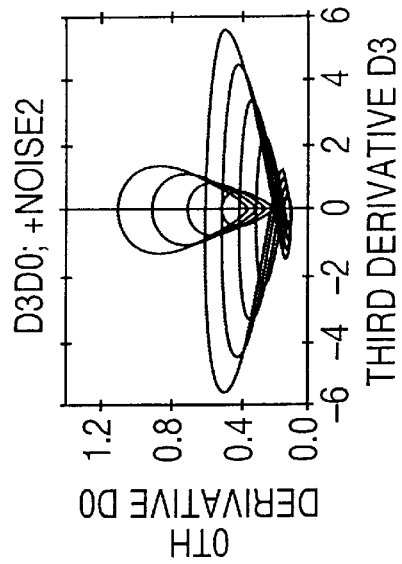
FIGS. 17A to 17D respectively show D1–D0, D2–D0, D3–D0, and D4–D0 plottings obtained from the original model spectra and their derivative spectra shown in FIGS. 14A to 14E.
Figure 17C:
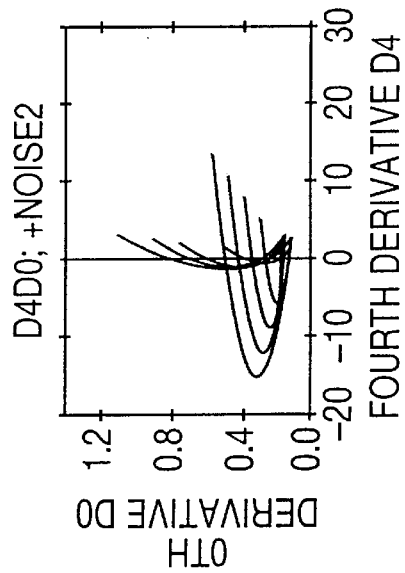
Figure 17B:
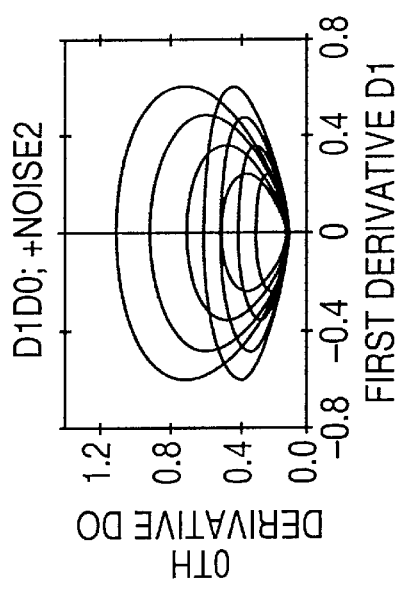
Figure 17D:
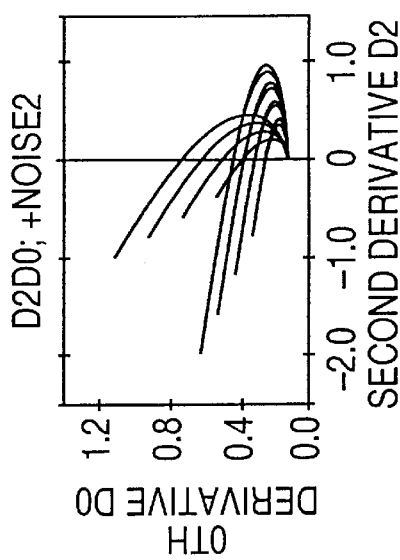
Figure 18C:
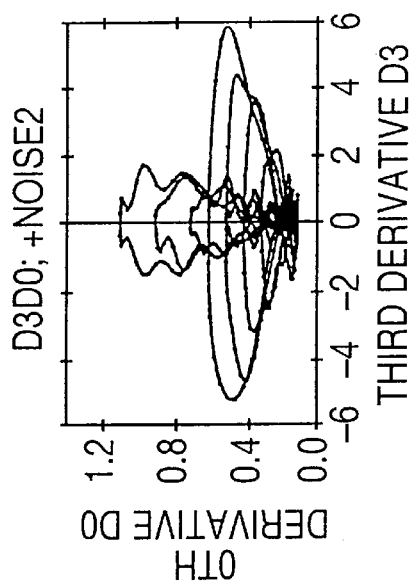
FIGS. 18A to 18D respectively show D1–D0, D2–D0, D3–D0, and D4–D0 plottings obtained from the original model spectra and derivative spectra shown in FIGS. 15A to 15E.
Figure 18D:
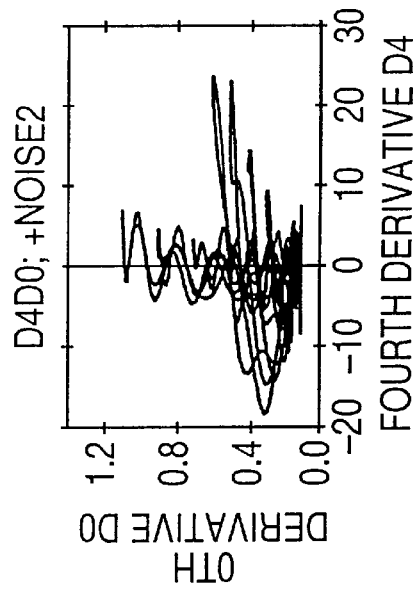
Figure 18A:
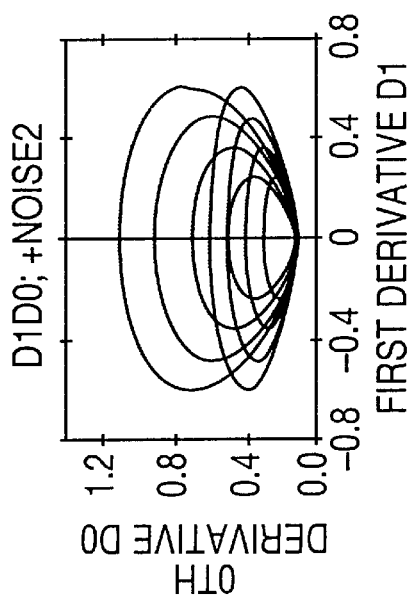
Figure 18B:
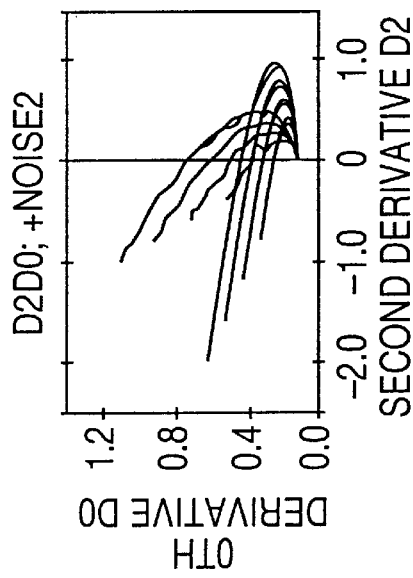
Figure 19A:
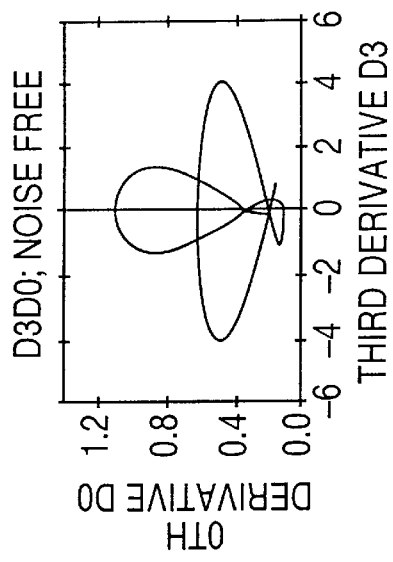
FIGS. 19A to 19D respectively show D1–D0, D2–D0, D3–D0, and D1–D2 plottings obtained from an original model spectrum without noise and derivative spectra obtained by differentiation for continuous functions.
Figure 19C:
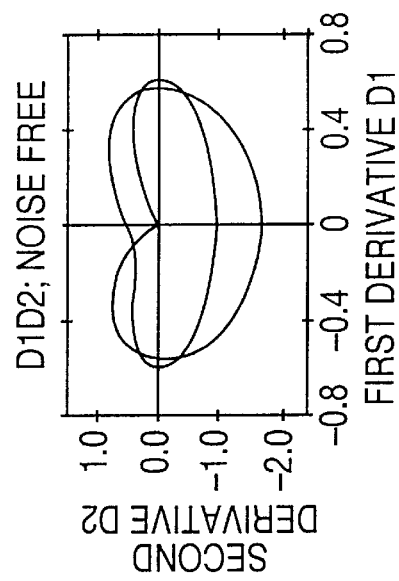
Figure 19B:
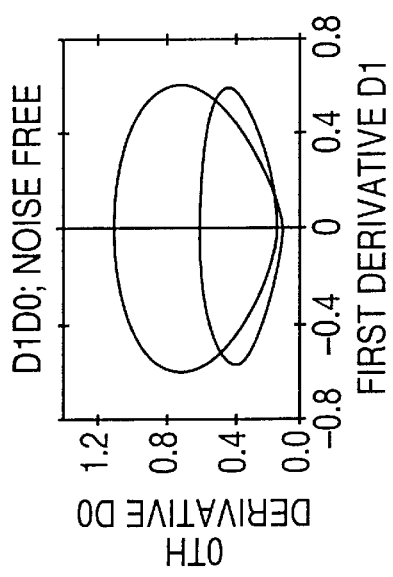
Figure 19D:
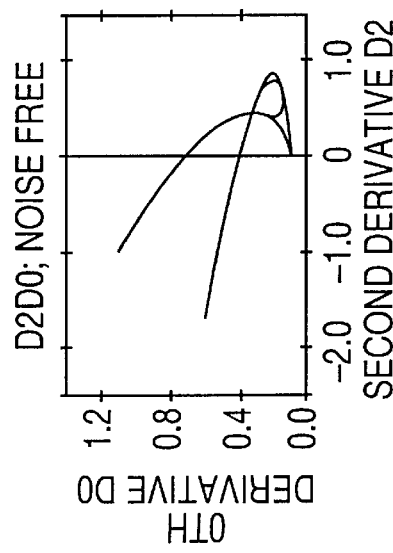
Figure 20C:
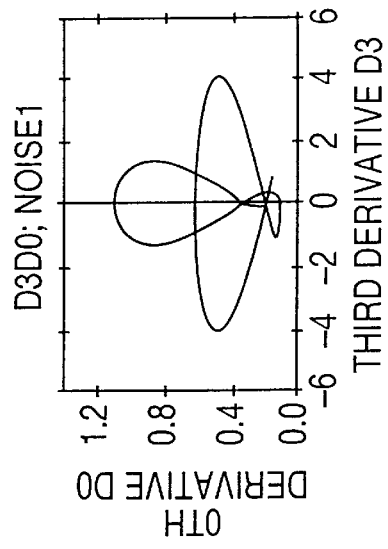
FIGS. 20A to 20D respectively show D1–D0, D2–D0, D3–D0, and D1–D2 plottings obtained from an original model spectrum containing noise of level 1 and its derivative spectra obtained by numerical differentiation through least-squares curve fitting for approximating quadratic polynomials.
Figure 20D:
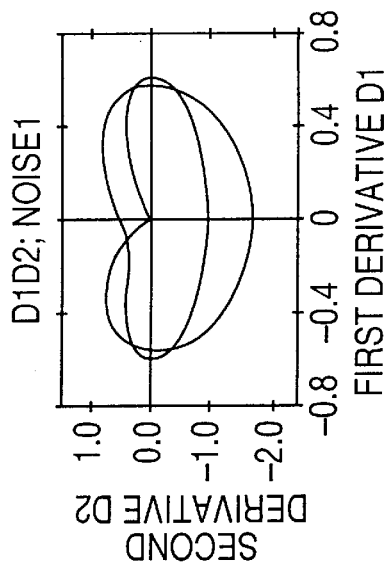
Figure 20A:
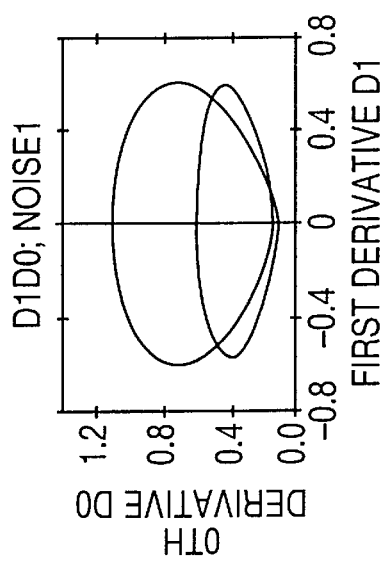
Figure 20B:
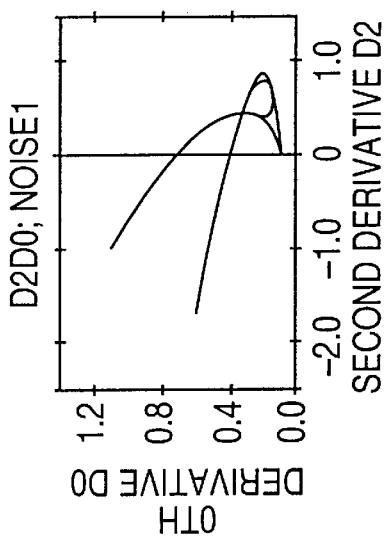
Figure 21C:
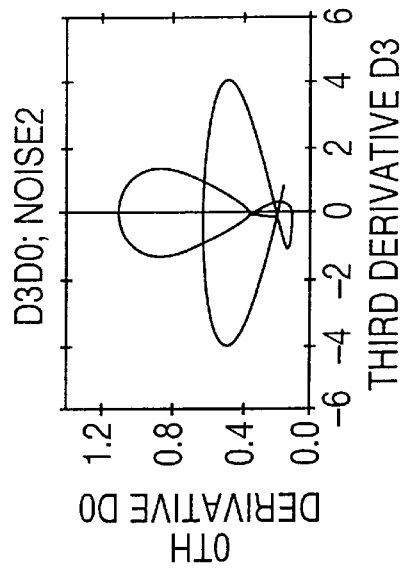
FIGS. 21A to 21D respectively show D1–D0, D2–D0, D3–D0, and D1–D2 plottings obtained from an original model spectrum containing noise of level 2 and its derivative spectra obtained by numerical differentiation through least-squares curve fitting for approximating quadratic polynomials.
Figure 21D:
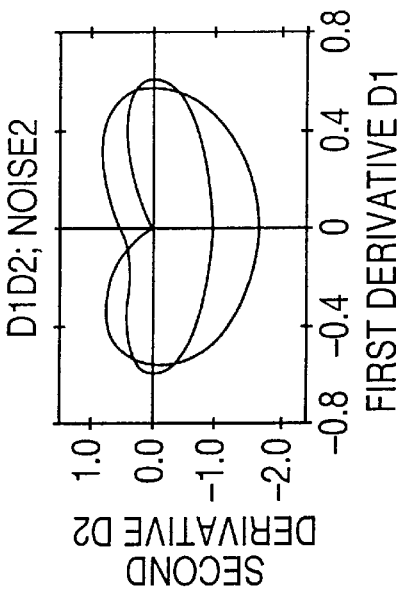
Figure 21A:
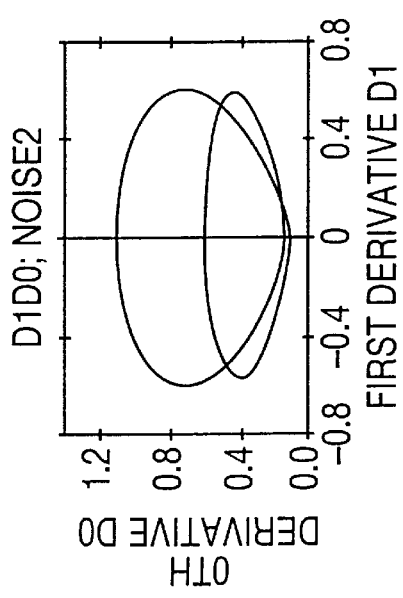
Figure 21B:
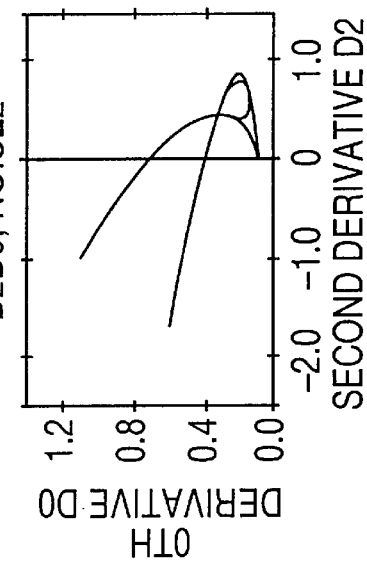
Figure 22C:
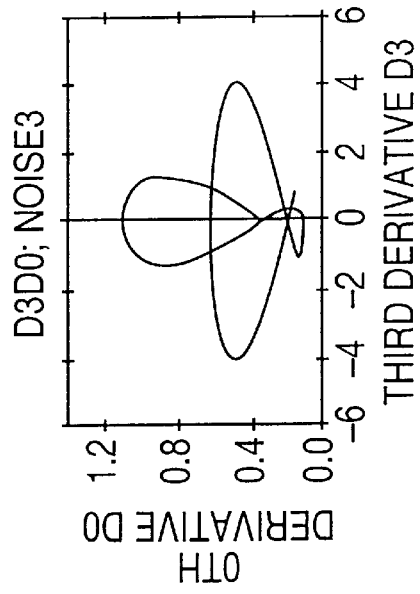
FIGS. 22A to 22D respectively show D1–D0, D2–D0, D3–D0, and D1–D2 plottings obtained from an original model spectrum containing noise of level 3 and its derivative spectra obtained by numerical differentiation through least-squares curve fitting for approximating quadratic polynomials.
Figure 22D:
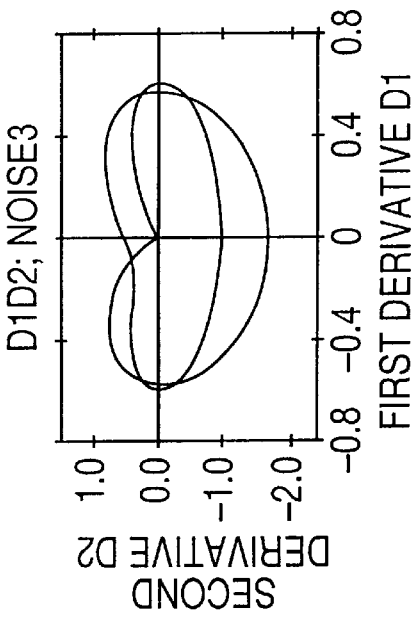
Figure 22A:
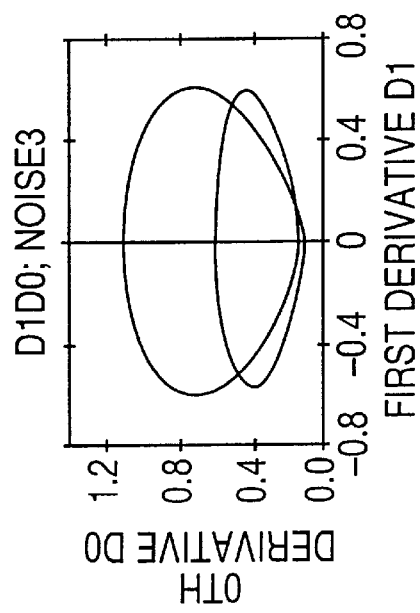
Figure 22B:
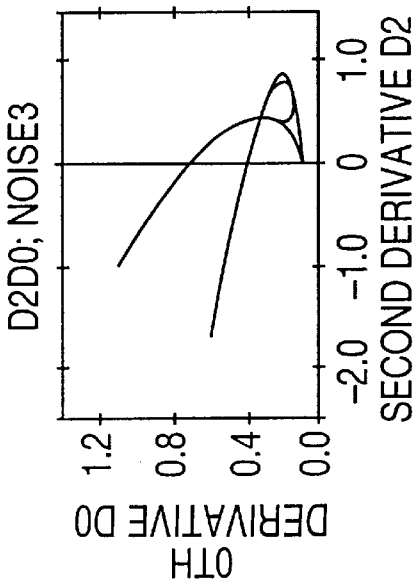
Figure 23A:
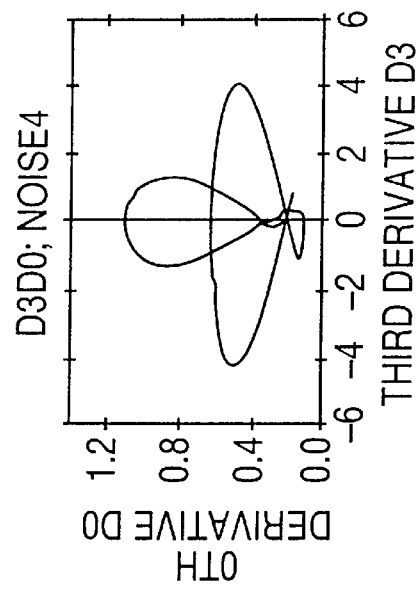
FIGS. 23A to 23D respectively show D1–D0, D2–D0, D3–D0, and D1–D2 plottings obtained from an original model spectrum containing noise of level 4 and its derivative spectra obtained by numerical differentiation through least-squares curve fitting for approximating quadratic polynomials.
Figure 23C:
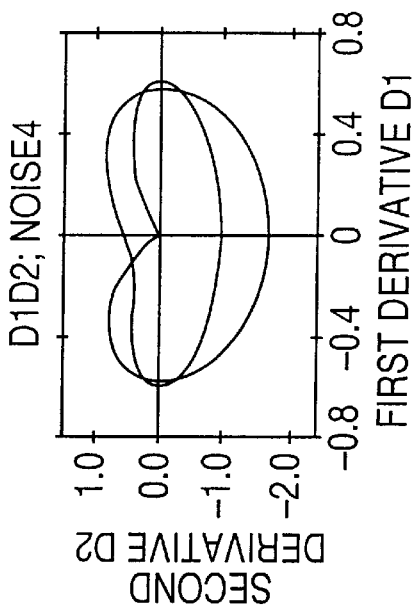
Figure 23B:
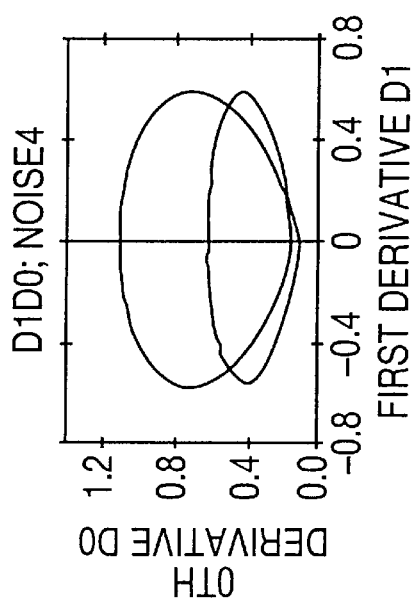
Figure 23D:
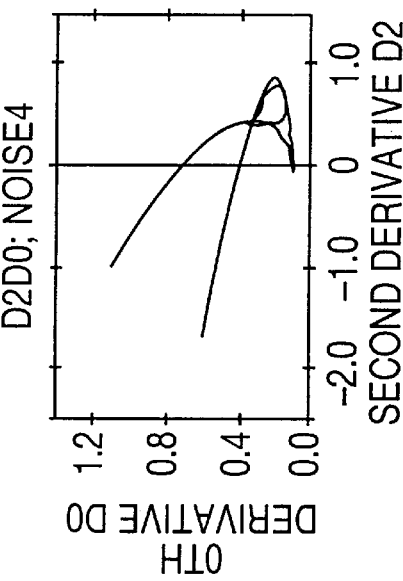
Figure 24C:
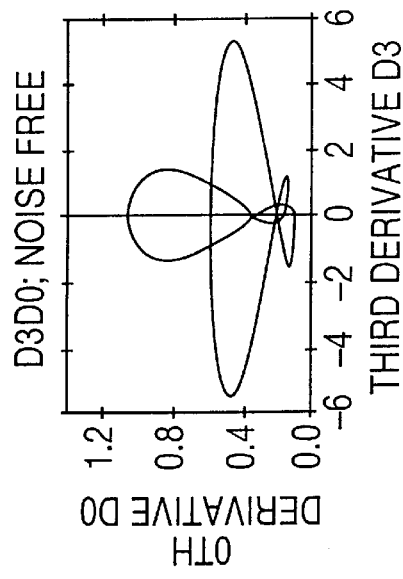
FIGS. 24A to 24D respectively show D1–D0, D2–D0, D3–D0, and D1–D2 plottings obtained from an original model spectrum without noise and derivative spectra obtained by differentiation for continuous functions.
Figure 24D:
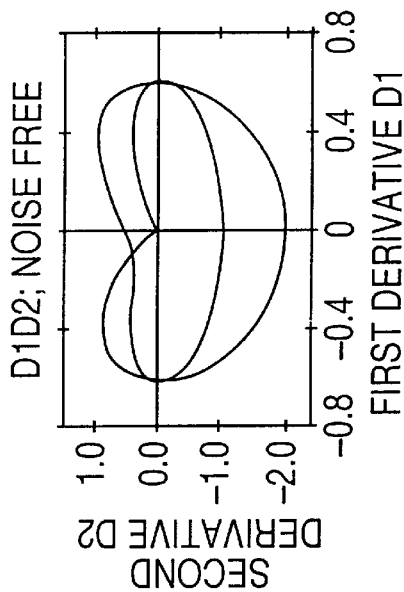
Figure 24A:
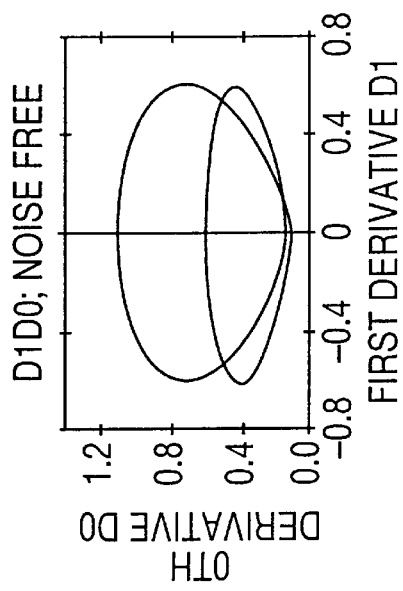
Figure 24B:
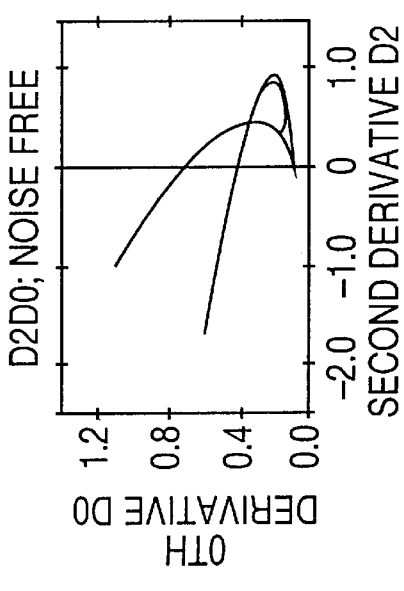
Figure 25C:
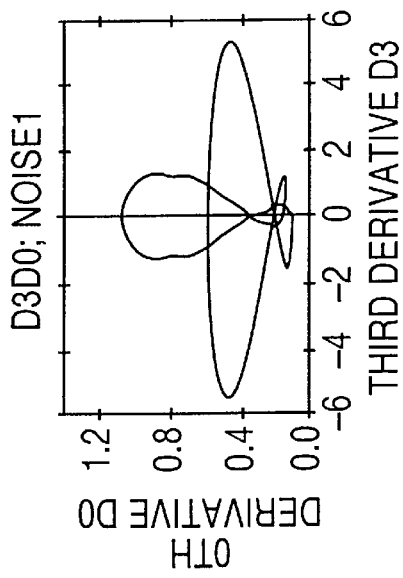
FIGS. 25A to 25D respectively show D1–D0, D2–D0, D3–D0, and D1–D2 plottings obtained from an original model spectrum containing noise of level 1 and derivative spectra obtained by numerical differentiation through least-squares curve fitting for approximating cubic or quartic polynomials.
Figure 25D:
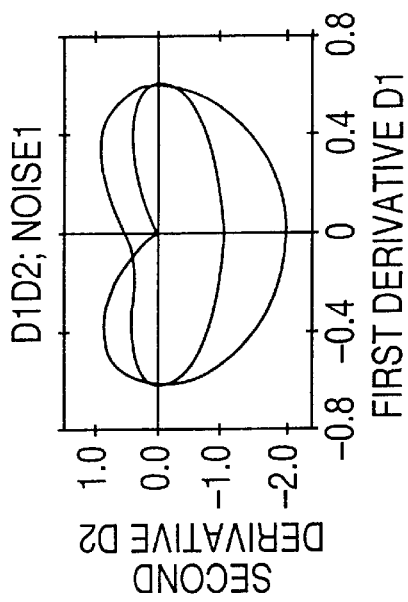
Figure 25A:
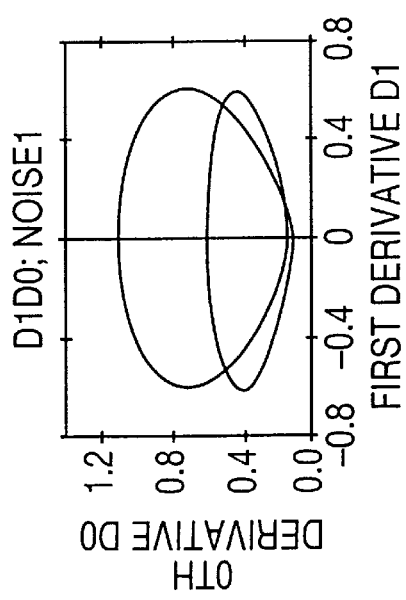
Figure 25B:
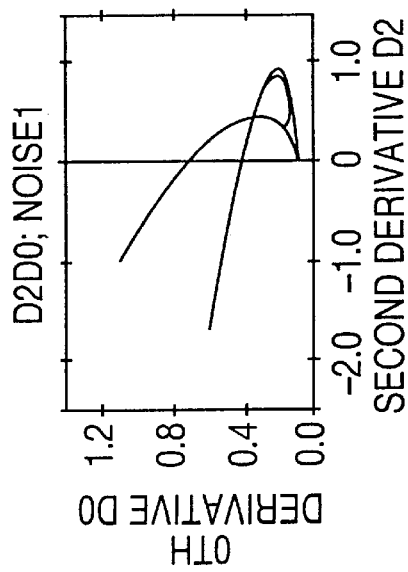
Figure 26A:
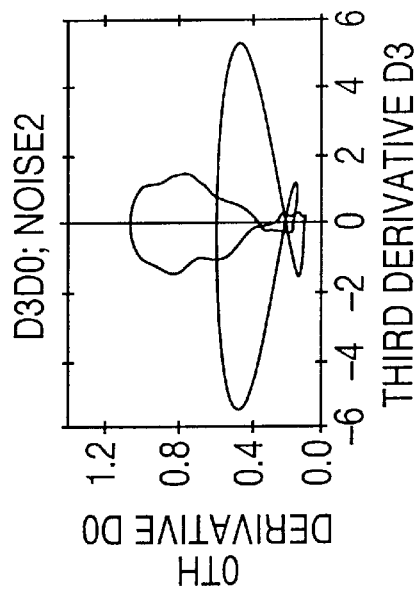
FIGS. 26A to 26D respectively show D1–D0, D2–D0, D3–D0, and D1–D2 plottings obtained from an original model spectrum containing noise of level 2 and its derivative spectra obtained by numerical differentiation through least-squares curve fitting for approximating cubic or quartic polynomials.
Figure 26C:
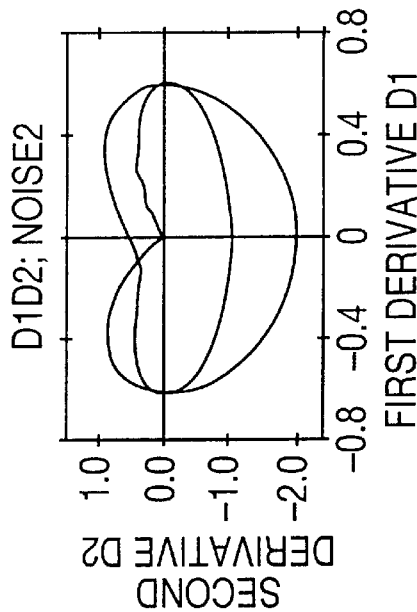
Figure 26B:
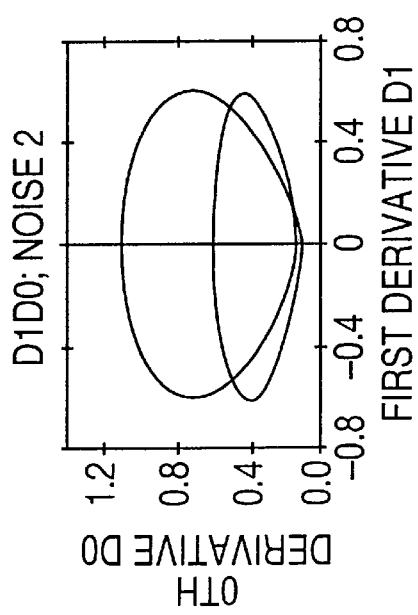
Figure 26D:
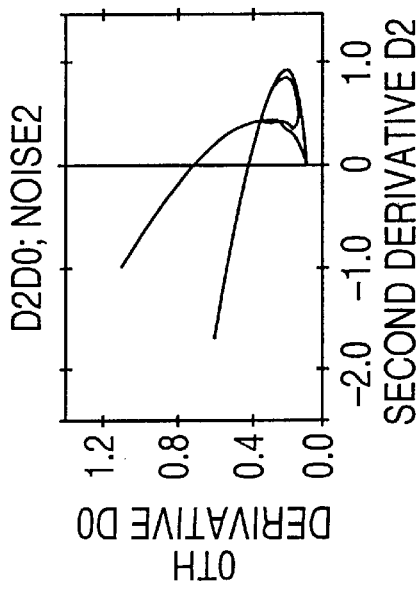
Figure 27C:
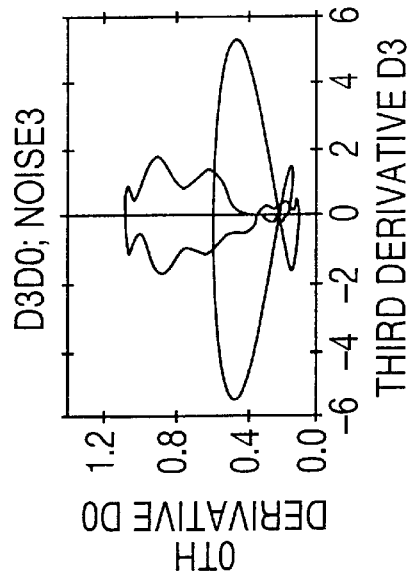
FIGS. 27A to 27D respectively show D1–D0, D2–D0, D3–D0, and D1–D2 plottings obtained from an original model spectrum containing noise of level 3 and its derivative spectra obtained by numerical differentiation through least-squares curve fitting for approximating cubic or quartic polynomials.
Figure 27D:
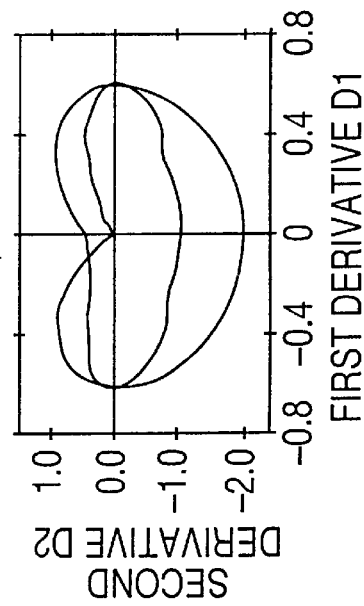
Figure 27A:
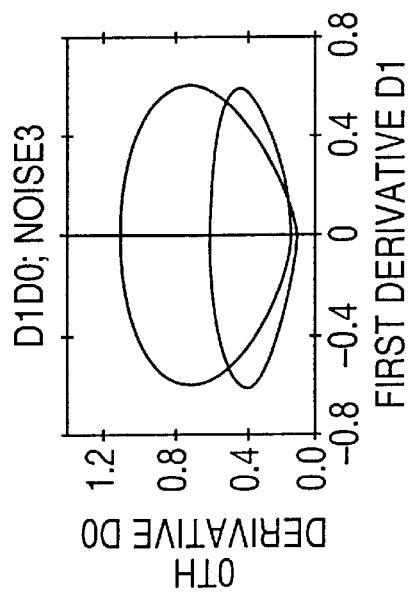
Figure 27B:
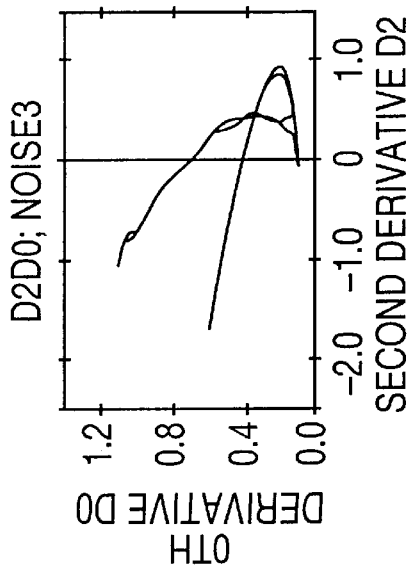
Figure 28A:
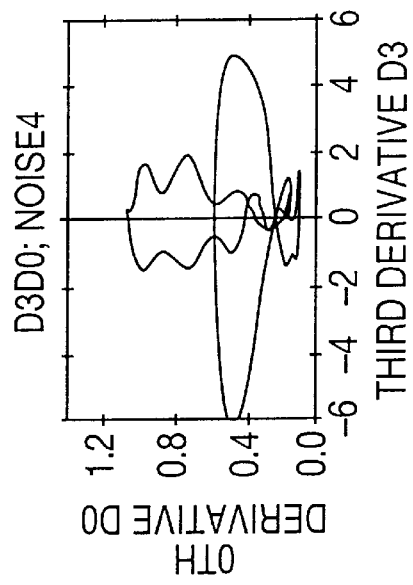
FIGS. 28A to 28D respectively show D1–D0, D2–D0, D3–D0, and D1–D2 plottings obtained from an original model spectrum containing noise of level 4 and its derivative spectra obtained by numerical differentiation through least-squares curve fitting for approximating cubic or quartic polynomials, FIGS. 29A to 29C respectively show D0–D3 plotttings of casts 1.
Figure 28C:
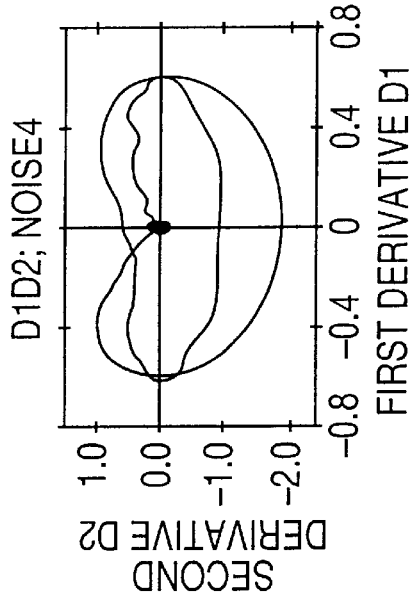
Figure 28B:
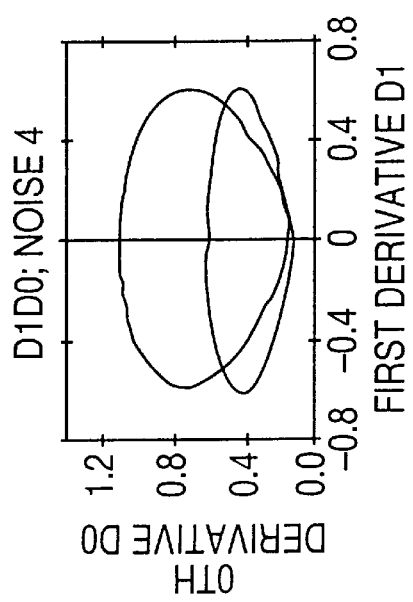
Figure 28D:
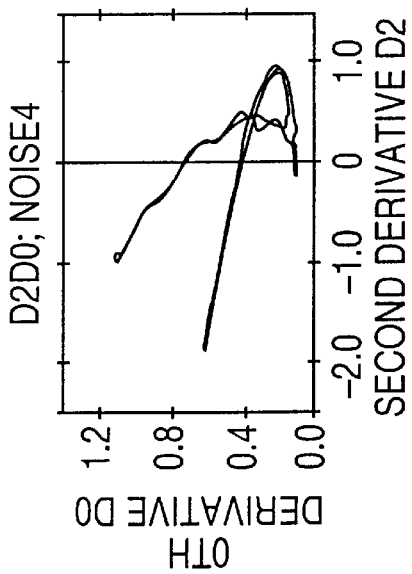
Figure 29A:
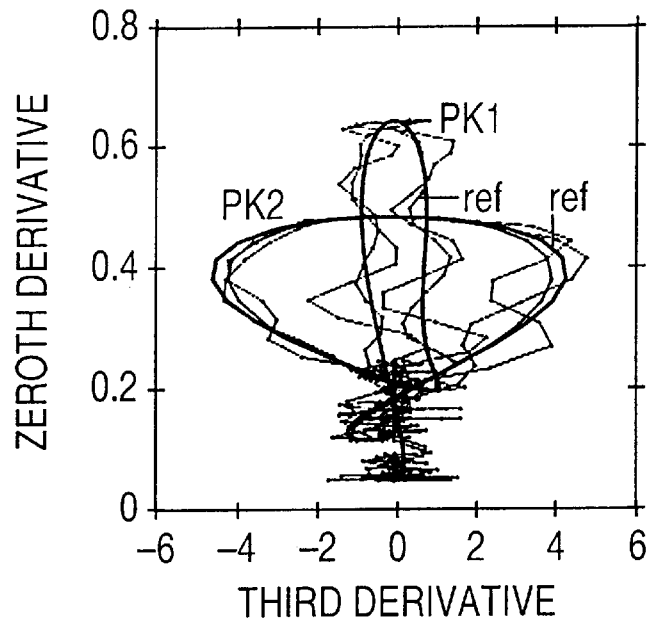
Figure 29B:
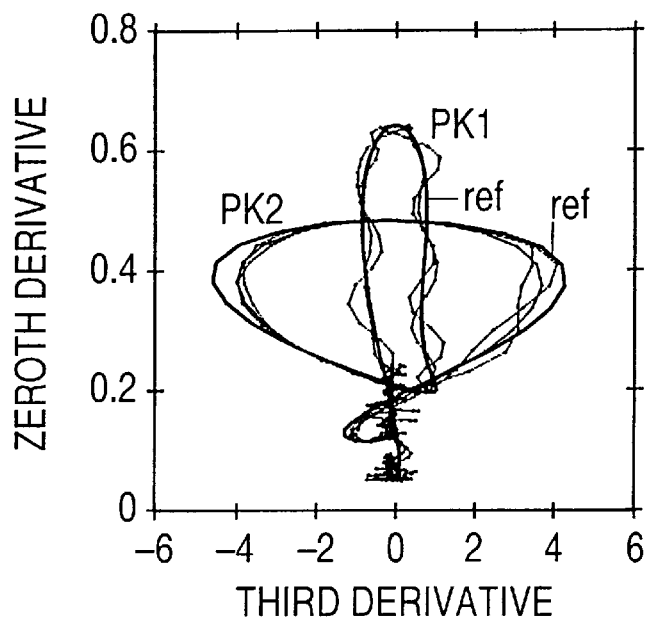
Figure 29C:
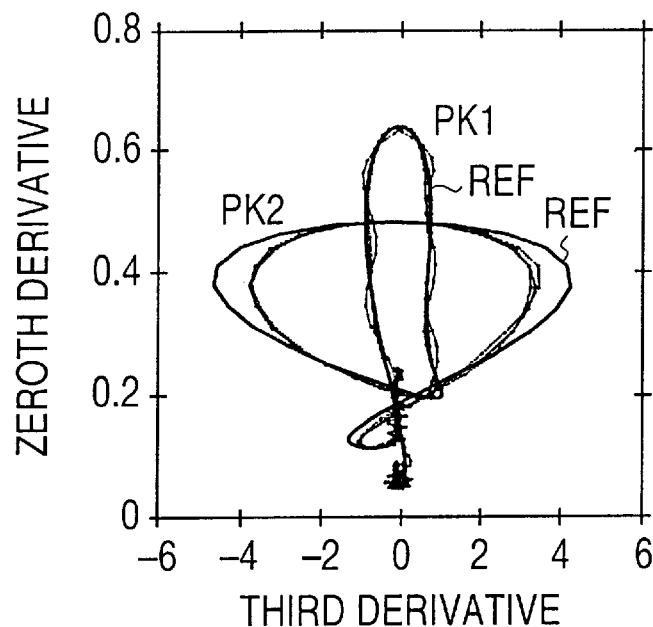

FIGS. 12A to 12H show profiles obtained from the 2D profiles shown in FIGS. 11A to 11H by connecting points corresponding to the same wavenumber or wavelength with straight lines. In the present simulation examples, the original model spectra shown in FIG. 10A are unimodal Gaussian functions of different heights, and their baselines are a horizontal line without any offset, which are the x-axis. Therefore, points corresponding to the same wavenumber are on a single straight line that passes through the origin. The straight line is hereafter called iso-wavenumber line. In all the iso-wavenumber lines, the ratio of the distances from the origin to plotted points is the ratio of the heights of the peaks. In the 2D plottings (two-dimensional representations), linearity holds. Therefore, the profiles can be easily extended or contracted.

In general, if some iso-wavenumber lines do not pass the origin, then the v intercepts of the iso-wavenumber lines give useful information about effects of some errors, the background and the like.

2D Plotting and Least-Squares Fitting.

Considering material properties of the analyzed object and the like, if points corresponding to the same wavenumber are predicted or assumed to be on a single straight line, then errors in any spectrum or data points can be corrected by fitting a straight line into the points corresponding to the same wavenumber by the method of least squares. As such fitting techniques, there can be employed the ordinary least-squares fitting that minimizes the sum of squared errors in the ordinates and the two-dimensional fitting, called hereafter 2D fitting, which minimizes the sum of squared errors in both the ordinates and abscissas. Further, in the baseline region, higher derivative spectra become nearer to the real values, so that local fitting can also be employed.

Selection of Optimal Parameters for Numerical Derivatives.

In general, differentiation amplifies high-frequency noise, so that the differentiation of a spectrum having a small SN ratio demands careful considerations. In the digital differentiation by the Savitzky-Golay method, the optimal degree of the polynomials and the optimal number of data points used for least-squares curve fitting should be determined by considering the half band width of the spectrum and the characteristic of noise. However, in practice, these parameters are determined by trial and error.

In the digital differentiation in accordance with the present invention, the second derivative is obtained by repeating the first differentiation (2-pass method). Similarly, higher derivatives are obtained by a multipass method.

Results of comparing and evaluating the differentiation obtained by least-squares curve fitting for approximating quadratic polynomials with the differentiation obtained by least-squares curve fitting for approximating cubic or quartic polynomials are described in the following.

Here, the functions defined by the following equation (9), which are obtained by combining two Gaussian functions were used for spectra for simulation, that is, original model spectra.

$$f(x)=k\{\exp[-(x+1)^2/2\sigma^2]+0.5\exp[-(x-3)^2/2(\sigma/2)^2]\}, \quad (9)$$

where $\sigma=1$, and $k=1, 0.8, 0.6, 0.4$. The digitization was performed with the data interval $0.04\sigma$.

Further, the functions $j(x)$ defined by the following equation (10), which are obtained by adding some random noise $n(x)$ to the functions $f(x)$ defined by the equation (9), were used for spectra containing noise in simulation.

$$j(x)=f(x)+n(x) \quad (10)$$

FIGS. 13A to 13E respectively show the original model spectra of the functions defined by the equation (9), their first derivative spectra, second derivative spectra, third derivative spectra, and fourth derivative spectra that were obtained by differentiation of the original model spectra for continuous functions.

FIGS. 14A to 14E respectively show the original model spectra of the functions defined by the equation (10), their first derivative spectra, second derivative spectra, third derivative spectra, and fourth derivative spectra that were obtained from the original model spectra by numerical differentiation through least-squares curve fitting for approximating quadratic polynomials.

FIGS. 15A to 15E respectively show the original model spectra of the functions defined by the equation (10), their first derivative spectra, second derivative spectra, third derivative spectra, and fourth derivative spectra that were obtained from the original model spectra by numerical differentiation through least-squares curve fitting for approximating cubic or quartic polynomials.

From these results, it is observed that effects of noise rarely occur in numerical differentiation through least-squares curve fitting for approximating quadratic polynomials, but the effects become comparatively great in numerical differentiation through least-squares curve fitting for approximating cubic or quartic polynomials.

FIGS. 16A to 16D respectively show D1–D0, D2–D0, D3–D0, and D4–D0 plottings obtained from the original model spectra and their derivative spectra obtained by differentiation for continuous functions and shown in FIGS. 13A to 13E.

FIGS. 17A to 17D respectively show D1–D0, D2–D0, D3–D0, and D4–D0 plottings obtained from the original model spectra and their derivative spectra obtained by numerical differentiation through least-squares curve fitting for approximating quadratic polynomials and shown in FIGS. 14A to 14E.

FIGS. 18A to 18D respectively show D1–D0, D2–D0, D3–D0, and D4–D0 plottings obtained from the original model spectra and their derivative spectra obtained by numerical differentiation through least-squares curve fitting for approximating cubic or quartic polynomials and shown in FIGS. 15A to 15E.

From these results, it is observed that effects of noise rarely appear on the 2D plottings obtained by numerical differentiation through least-squares curve fitting for approximating quadratic polynomials, but the effects become comparatively apparent on the 2D plottings obtained by numerical differentiation through least-squares curve fitting for approximating cubic or quartic polynomials.

In the following, 2D plottings created by differentiation for continuous functions from an original model spectrum without noise are taken as ideal 2D plottings. Then 2D plottings created by numerical differentiation through least-squares curve fitting for approximating quadratic polynomials and approximating cubic or quartic polynomials from the original model spectrum containing noise are compared with and evaluated against the ideal plottings.

FIGS. 19A to 19D respectively show D1–D0, D2–D0, D3–D0, and D1–D2 plottings obtained from an original model spectrum without noise and its derivative spectra obtained by differentiation for continuous functions.

FIGS. 20A to 20D respectively show D1–D0, D2–D0, D3–D0, and D1–D2 plottings obtained from an original model spectrum containing noise of level 1 (Noise 1) and its derivative spectra obtained by numerical differentiation through least-squares curve fitting for approximating quadratic polynomials.

FIGS. 21A to 21D respectively show D1–D0, D2–D0, D3–D0, and D1–D2 plottings obtained from an original model spectrum containing noise of level 2 (Noise 2) and derivative spectra obtained by numerical differentiation through least-squares curve fitting for approximating quadratic polynomials.

FIGS. 22A to 22D respectively show D1–D0, D2–D0, D3–D0, and D1–D2 plottings obtained from an original model spectrum containing noise of level 3 (Noise 3) and its derivative spectra obtained by numerical differentiation through least-squares curve fitting for approximating quadratic polynomials.

FIGS. 23A to 23D respectively show D1–D0, D2–D0, D3–D0, and D1–D2 plottings obtained from an original model spectrum containing noise of level 4 (Noise 4) and its derivative spectra obtained by numerical differentiation through least-squares curve fitting for approximating quadratic polynomials.

FIGS. 24A to 24D respectively show D1–D0, D2–D0, D3–D0, and D1–D2 plottings obtained from an original model spectrum without noise and its derivative spectra obtained by differentiation for continuous functions.

FIGS. 25A to 25D respectively show D1–D0, D2–D0, D3–D0, and D1–D2 plottings obtained from an original model spectrum containing noise of level 1 (Noise 1) and its derivative spectra obtained by numerical differentiation through least-squares curve fitting for approximating cubic or quartic polynomials.

FIGS. 26A to 26D respectively show D1–D0, D2–D0, D3–D0, and D1–D2 plottings obtained from an original model spectrum containing noise of level 2 (Noise 2) and its derivative spectra obtained by numerical differentiation through least-squares curve fitting for approximating cubic or quartic polynomials.

FIGS. 27A to 27D respectively show D1–D0, D2–D0, D3–D0, and D1–D2 plottings obtained from an original model spectrum containing noise of level 3 (Noise 3) and its derivative spectra obtained by numerical differentiation through least-squares curve fitting for approximating cubic or quartic polynomials.

FIGS. 28A to 28D respectively show D1–D0, D2–D0, D3–D0, and D1–D2 plottings obtained from an original model spectrum containing noise of level 4 (Noise 4) and its derivative spectra obtained by numerical differentiation through least-squares curve fitting for approximating cubic or quartic polynomials,.

It is clear from FIGS. 13A to 28D that if quadratic polynomials are used for numerical differentiation, then effects of noise are not great, but the magnitudes of the spectra are slightly less than the ones obtained by differentiation for continuous functions. If cubic or quartic polynomials are used for numerical differentiation, then effects of noise are great, but the magnitudes of the spectra are approximately the same as the ones obtained by differentiation for continuous functions. In the first derivatives, the differences between the ones for approximating quadratic polynomials and the ones for approximating cubic or quartic polynomials are small. The differences become greater in higher derivatives. If effects of noise are important, the use of quadratic polynomials is practical.

Selection of Optimal Parameters for Digital Derivatives.

In the above method of processing spectral data, a smoothed function and each of the $n_1$th and $n_2$th derivatives can be obtained by repeating the following numerical differentiation by the order of the derivative. Let all the data points $(x_i, y_i)$ be arranged such that $x_i < x_{i+1}$. An approximating quadratic polynomial is obtained for each $x_0$ of data points by least-squares curve fitting from a predetermined number 2m+1 of the data points $(x_{-m}, y_{-m}) \ldots, (x_{-1}, y_{-1})$ $(x_0, y_0), (x_1, y_1), \ldots, (x_m, y_m)$ The value $z_0$ of the obtained quadratic polynomial at $x_0$ is the value of the smoothed function at $x_0$. Further, if the obtained quadratic polynomial is differentiated at $x_0$, then the derivative value $y_0'$ at $x_0$ is obtained. In this way, the pairs $(x_i, z_i)$ and $(x_i, y_i')$ are obtained for all data points $(x_i, y_i)$ except those near the lower and upper limits of the abscissas. For the second derivative, the original data points $(x_i, y_i)$ are replaced with $(x_i, y_i')$ and the above smoothing and differentiation procedures are repeated.

In the digital smoothing (curve fitting) and differentiation procedures of Savitzky and Golay (Savitzky & Golay, "Smoothing and differentiation of data by simplified least squares procedures," Analytical Chemistry 36 (1964)), the data points must be at a fixed and uniform data interval for their abscissas. In this restricted case, the smoothed value $z_0$ and derivative value $y_0'$ at $x_0$ are respectively the values of respective linear functions of $y_{-m} \ldots, y_{-1}, y_0, y_1, \ldots, y_m$. Each of the linear functions is independent of specific values of the data points $(x_{-m}, y_{-m}) \ldots, (x_{-1}, y_{-1}), (x_0, y_0), (x_1, y_1), \ldots, (x_m, y_m)$ and determined by the degree of the approximating polynomials, and the window width 2m+1 (the number of filter points). In these procedures, an optimal degree of the approximating polynomials and an optimal window width 2m+1 should be determined by considering the half band width of the spectrum and noise level. Which combination of these two parameters is optimal depends on individual cases. Usually, the digital smoothing and differentiation are performed with different combinations of the two parameters, and the results are evaluated by observing the reduction of noise and the distortion of waveforms. Then an optimal combination of the parameters is determined somewhat arbitrarily, based on the evaluation. Therefore, no practical criteria for the selection are established.

Concerning the selection of the parameters for the digital smoothing and differentiation, we evaluated the results of the 2D plotting representations based on their patterns. We used the following bimodal function containing two Gaussian peaks for a simulation.

$$f(x)=0.6\exp[-(x+1)^2/2\sigma_1^2]+0.4\exp[-(x-2)^2/2\sigma_2^2],$$

where $\sigma_1=1$, $\sigma_2=0.5$. Then we digitized the simulation function with the data interval $0.04\sigma$. Further, we added peak-to peak random noise of noise levels 0.001, 0.002, 0.005, 0.01, 0.05 respectively to the digitized simulation function to obtain original data for evaluation.

We selected the following two cases for the choice of the degrees of polynomials for smoothing and differentiation and performed smoothing and differentiation independently from each other to obtain the derivatives up to the fourth order. We obtained the derivatives by repeating smoothing followed by differentiation. For example, we obtained the third derivative from the original data by successively performing smoothing, differentiation, smoothing, differentiation, smoothing, and differentiation.

(1) Smoothing for approximating quadratic or cubic polynomials and differentiation for approximating quadratic polynomials. Here the use of quadratic polynomials in smoothing produces the same results as the use of cubic polynomials.

(2) Smoothing for approximating quartic or quintic polynomials and differentiation for approximating cubic or quartic polynomials. Here, use of quartic polynomials in smoothing produces the same results as the use of quintic polynomials. The use of cubic polynomials in differentiation produces the same results as the use of quartic polynomials.

We varied the number of filter points from 5 to 25 and examined their appropriateness in the D3–D0 plottings. We conducted the analysis and evaluation through observation.

FIGS. 29A to 29C and FIGS. 30A to 30C respectively show the D3–D0 plottings in the above cases (1) and (2). To ease observation, the plotting obtained from the original continuous function without containing noise is also shown with the label ref. The three graphs of FIGS. 29A to 29C respectively show the cases of the number of filter points 7, 9, and 11, which are near the optimal number. If the number of filter points is small, then effects of smoothing are not obtained. If the number of filter points is large, then effects of smoothing are obtained, but the height of the smaller peak becomes exceedingly smaller than that of the original continuous function. Therefore an optimal number of filter points should be determined by balancing smoothing effects on noise and reproducibility of signals. In the case (1), the performance of digital smoothing and differentiation is generally not good, but the choice of the number of filters 11 is probably the best.

Figure 30A:
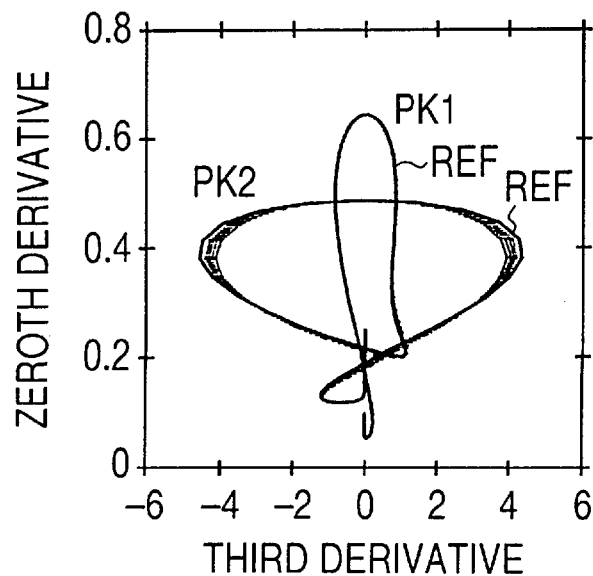
FIGS. 30A to 30C respectively show D0–D3 plottings of case 2.
Figure 30B:
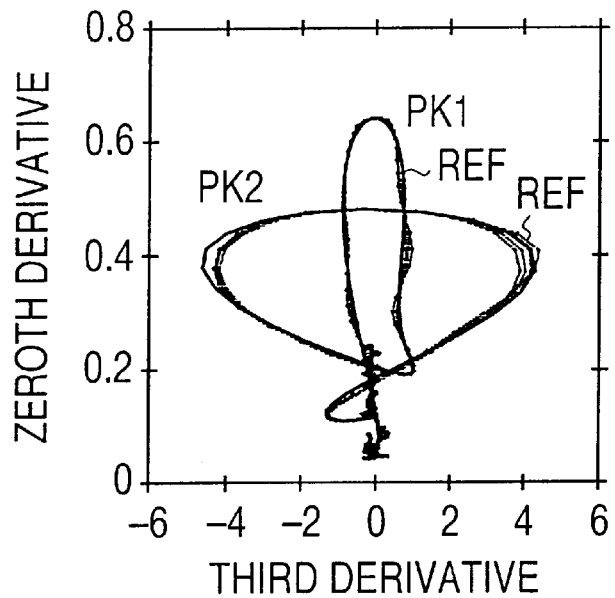
Figure 30C:
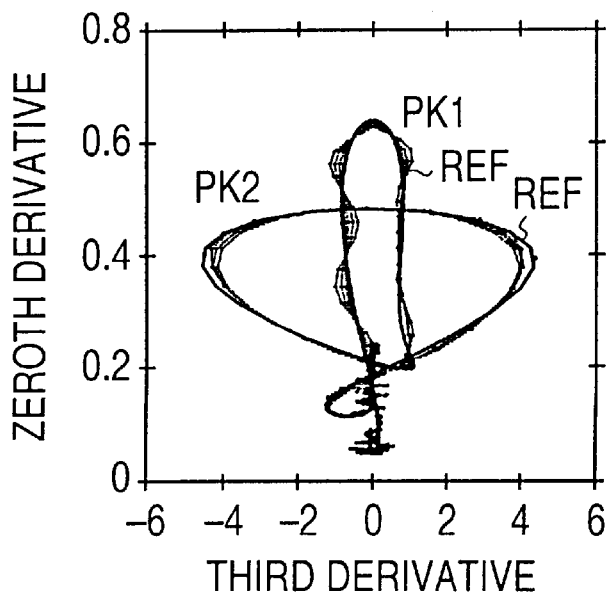
Figure 31A:
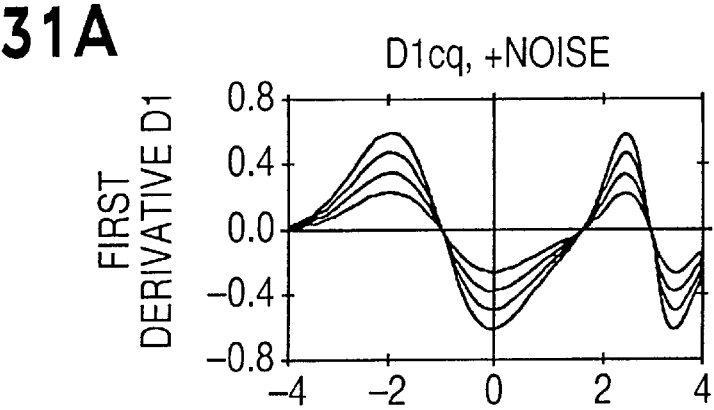
FIGS. 31A to 31D respectively show the first derivative spectra, second derivative spectra, third derivative spectra, and fourth derivative spectra of original model spectra obtained by numerical differentiation through least-squares curve fitting for approximating cubic or quartic polynomials.
Figure 31B:
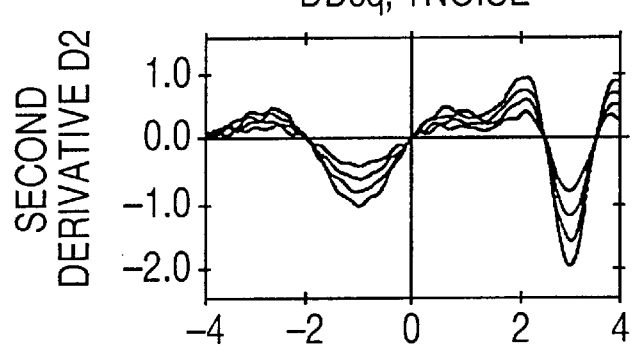
Figure 31C:
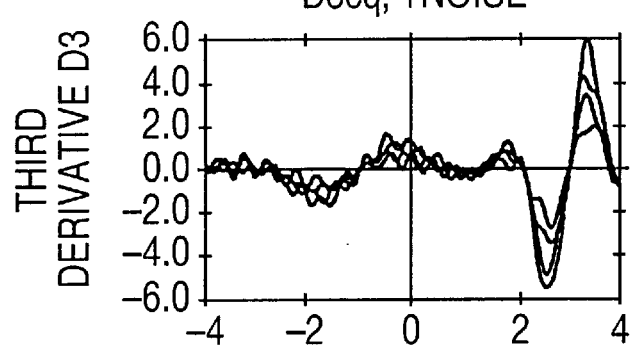
Figure 31D:
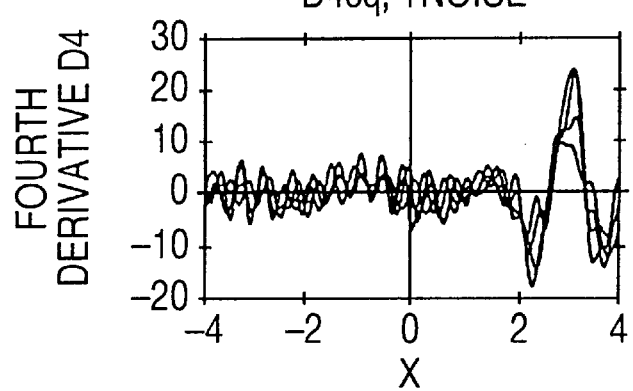
Figure 31E:
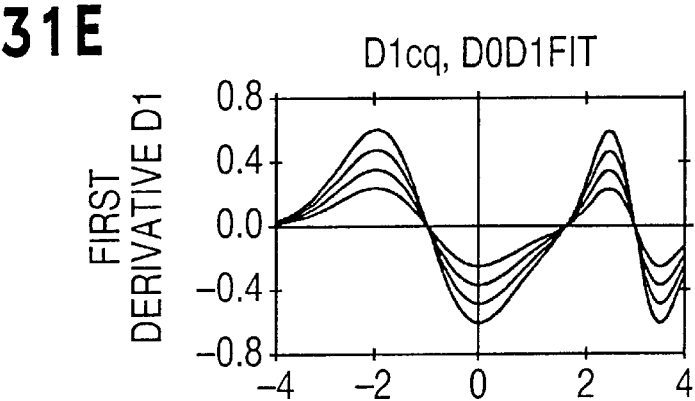
FIGS. 31E to 31H respectively show the first to fourth derivative spectra recreated from the corrected values obtained by applying 2D fitting of least squares to D1–D0, D2–D0, D3–D0, and D4–D0 plottings for the spectra shown in FIGS. 31A to 31D.
Figure 31F:
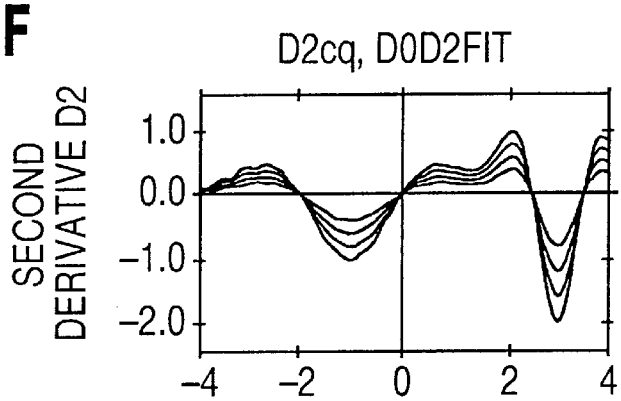
Figure 31G:
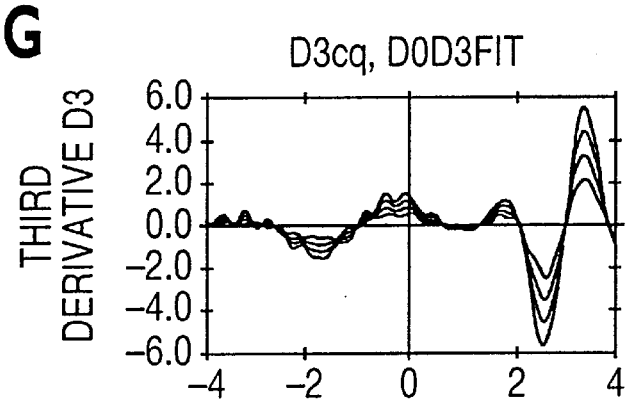
Figure 31H:
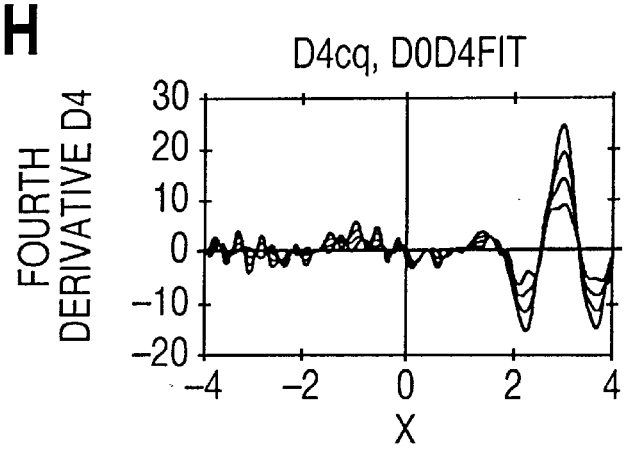

On the other hand, each graph of FIGS. 30A to 30C, which show the case (2), illustrates the cases of the number of filter points 17, 21, 25, which are near the optimal number. It is observed that the optimal number of filter points is 21 or 23 in the case (2). The performance of digital smoothing and differentiation in the case (2) is better than that in the case (1). In the D1–D0 plottings created from the first derivative, which are not illustrated, differences between the case (1) and the case (2) are small. However, differences between the two cases become greater in 2D plottings created from multipass higher differentiation. The degrees of smoothing noise and distorting peaks on the two Gaussian peaks having different heights and widths can also be observed. As described above, the performance of digital smoothing and differentiation can be evaluated from the observation of the patterns in 2D plotting representations.

2D Plotting and Least-Squares Fitting.

In multicomponent samples, the linear additivity of the absorbances of the components holds. That is, it can be assumed that points corresponding to the same wavenumber are on a single straight line. In this case, any spectrum or errors in data points can be corrected by least-squares curve fitting. As such fitting techniques, there can be employed the ordinary least-squares curve fitting that minimizes the sum of squared errors in the ordinates and the two-dimensional fitting that minimizes the sum of squared errors in both the ordinates and abscissas. Further, in the baseline region, higher derivative spectra become nearer to the real values, so that local fitting can also be employed.

For a simulation, we applied least-squares fitting to the 2D plottings obtained from the original model spectra of the functions defined by the equation (10) by numerical differentiation through least-squares curve fitting for approximating cubic or quartic polynomials. Then we examined effects of the least-squares fitting applied to the 2D plottings.

FIGS. 31A to 31D respectively show the first derivative spectra, second derivative spectra, third derivative spectra, and fourth derivative spectra of the original model spectra of the functions defined by the equation (10). Here, the derivative spectra are obtained from digital differentiation by least-squares curve fitting for approximating cubic or quartic polynomials.

FIGS. 31E to 31H respectively show the first to fourth derivative spectra recreated from the corrected or estimated values obtained by applying 2D fitting of least squares to D1–D0, D2–D0, D3–D0, and D4–D0 plottings for the spectra shown in FIGS. 31A to 31D.

Effects of 2D fitting of least squares are clearly observed from FIGS. 31A to 31H. The number of samples is 4 in this example. If the number of samples becomes greater, it is expected that effects of reducing noise and correcting distortion become greater.

These techniques cannot be employed in prior methods of spectral representation. In general, digital smoothing has been employed in prior methods of spectral representation to repress increasing effects of noise, but its effects have not been great.

It is clear that derivative spectra can be used in quantitative spectroscopic analysis. In this case, whether higher derivatives should be used or not is determined by balancing the effects of correcting the baseline and background obtained by differentiation with the effects of reducing noise accompanying higher derivatives.

Wavelength Shift and 2D Plotting.

A simple shift in the wavenumber or wavelength due to a shift of the origin or a reference point of the original spectrum can be resolved by displacement in the direction of the wavenumber in the case where the spectrum is a continuous function. However, digitized spectral data requires recalculation of approximations by interpolation at all wavenumbers, so that the processing is complex.

However, the wavenumber is a intermediary variable in a 2D plotting representation of the present invention. Therefore, the 2D plotting represents a profile that does not contain the wavenumber.

Figure 32A:
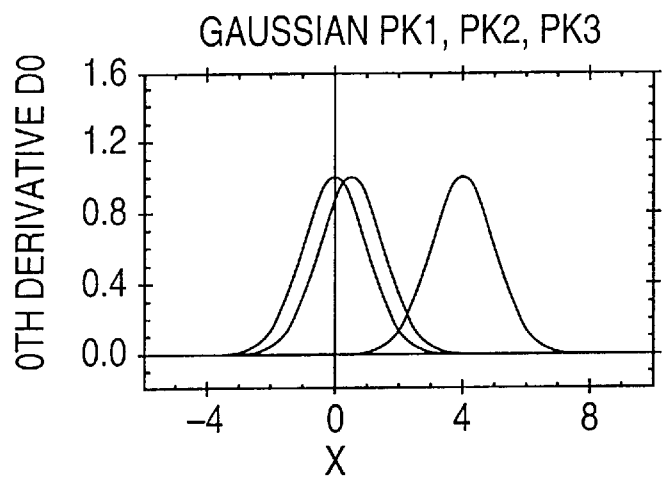
FIGS. 32A to 32C respectively show original spectra of Gaussian unimodal functions, each of which is obtained from each other by a wavenumber shift (wavelength shift), and their first and second derivative spectra.
Figure 32B:
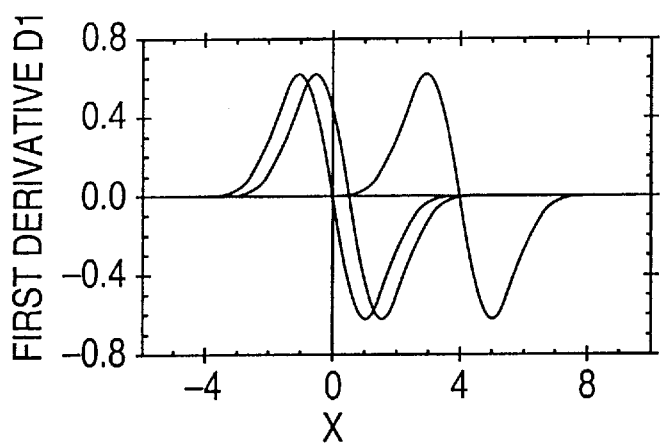
Figure 32C:
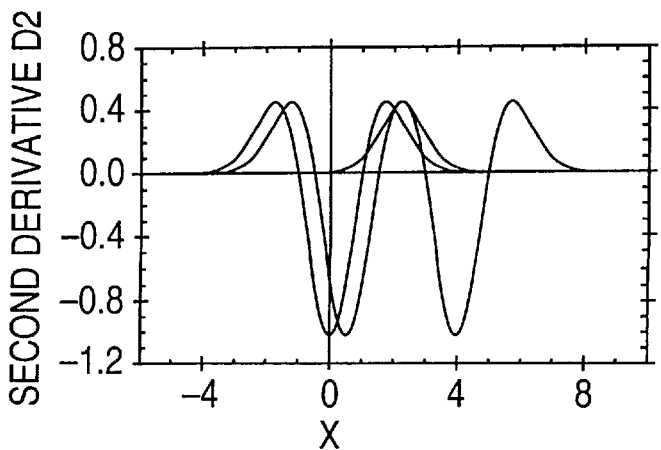

FIGS. 32A to 32C respectively show three original spectra of Gaussian unimodal functions, each of which is obtained from each other by a wavenumber shift (wavelength shift), and their first and second derivative spectra.

Figure 32D:
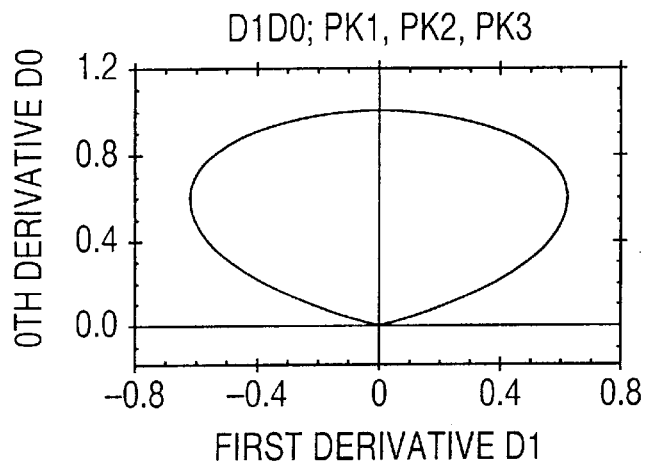
FIGS. 32D to 32F respectively show D1–D0, D2–D0, and D1–D2 plottings obtained from the original spectra and their derivative spectra shown in FIGS. 31A to 31C.
Figure 32E:
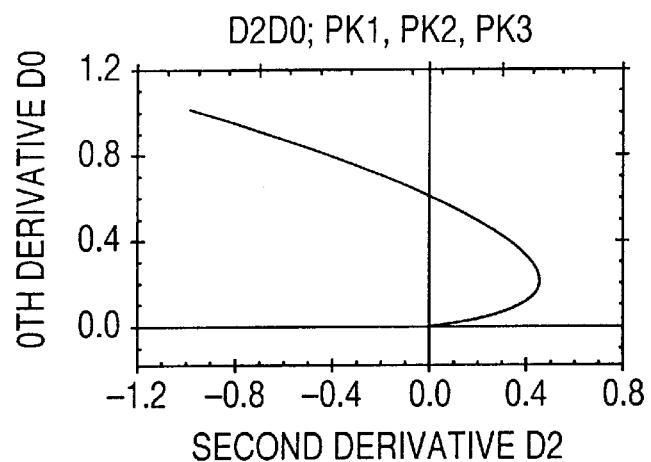
Figure 32F:
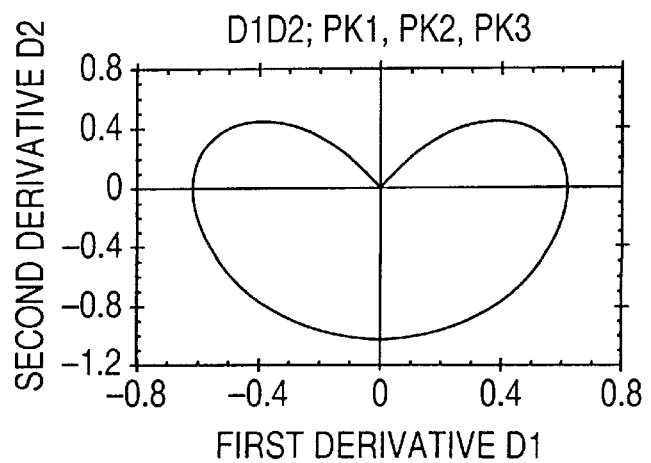

FIGS. 32D to 32F respectively show D1–D0, D2–D0, and D1–D2 plottings obtained from the original spectra and derivative spectra shown in FIGS. 32A to 32C. It is clear from these figures that in the 2D plottings, the profiles are the same.

As described above, the representation of 2D plotting is very useful in examining the similarity of peak profiles and the agreement with a reference profile. If the sign of the first derivative is reversed and plotted with the original first derivative, then the symmetry of a peak can be tested. In general, it requires trial-and-error calculation to obtain the axes of the center for symmetry. However, the calculation of the axes of the center for symmetry is unnecessary in the 2D plotting representation of the present invention.

Symmetry of Profiles.

In spectroscopic analysis of aqueous solutions, the region between peaks of absorption by water in which effects of absorption by water is small is worth consideration.

FIG. 33A shows the absorbance spectrum of water on the wavenumber region between 8000 $cm^{-1}$ and 4000 $cm^{-1}$. Features in the profiles of the absorbance spectrum on the wavenumber region between 4100 $cm^{-1}$ and 5000 $cm^{-1}$ are described in the following.

FIG. 33B is a D1–D0 plotting for the absorbance spectrum on the wavenumber region between 4100 $cm^{-1}$ and 5000 $cm^{-1}$.

FIG. 33C is D1–D0 plottings obtained from the D1–D0 plotting of FIG. 33B by reversing the sign of the first derivative and superimposing the obtained D1–D0 plotting over the original D1–D0 plotting. In this way, the symmetry can be tested without calculating the axes of the center for symmetry.

FIG. 33D illustrates the testing of whether the D1–D0 plotting shown in FIG. 33B can be approximated by a quadratic curve or not.

In this way, the 2D plottings can be employed for testing the symmetry of a profile and the like with the use of differentiation and graphical superimposition.

Response Characteristic of Detector and Optimal Cell Length.

In spectroscopic analysis, it is a fundamental to grasp the response characteristic (linearity) of the spectrometer. Results obtained by examining relationships between the optimal cell length and properties of 2D plottings, using variable-length cells, are described in the following. Here the cell length was varied in the range of 800 to 100 $\mu$m at an interval of 50 $\mu$m. A PbSe detector unit and CaF2 accompanying an FT-IR spectrometer were respectively used as the detector and the beam splitter.

Figure 34:
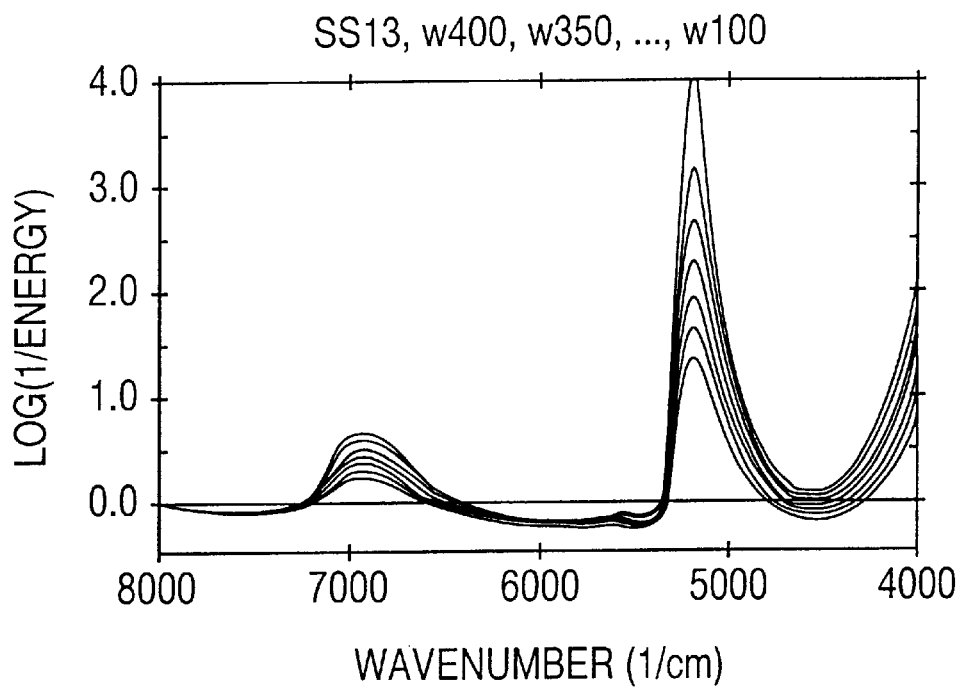
FIG. 34 shows single-beam spectra of water at cell lengths 100, 150, 200, 250, 300, 400 $\mu$m.
Figure 35:
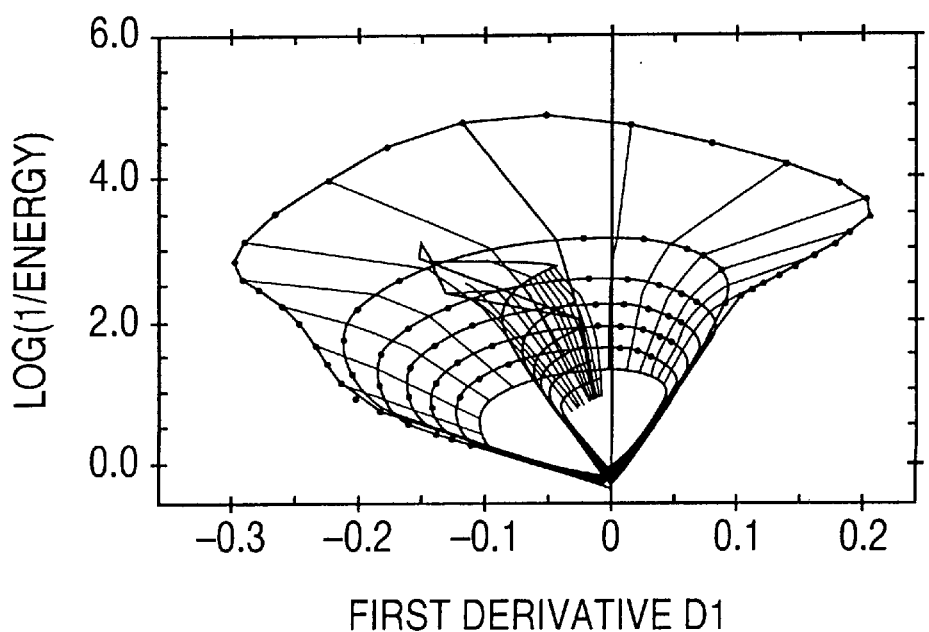
FIG. 35 shows 2D plottings for the single-beam spectra shown in FIG. 34 and iso-wavenumber lines.

FIG. 34 shows single-beam spectra of water at cell lengths 100, 150, 200, 250, 300, 400 $\mu$m. FIG. 35 shows their 2D plottings and iso-wavenumber lines.

Whether spectral data is linear or nonlinear cannot be read out from prior spectral representations. However, as clear from FIG. 35, if cell length exceeds 300 $\mu$m, then the characteristic absorption peak at 1.93 $\mu$m is nonlinear. It is observed that cell length is preferably not more than 200 $\mu$m in order to obtain a linear characteristic absorption peak of water in this wavenumber region.

Correction of Baseline.

In the comparison and determination of spectra, the reference values for determination, generally a baseline, are required to be the same among the spectra. The spectrum of a mixed component is buried in the background spectrum of water, so that the spectrum of the mixed component is observed from a difference spectrum. In this case, if the reference values are not the same, a desired clear difference spectrum cannot be obtained.

Further, when a quantitative model is created, a great number of standard samples are used. In this case, the tracing of spectra takes time, so that the drift of the spectrometer, setting errors of samples, and dispersion of sample conditions cannot be prevented. Further, baselines are shifted, inclined, bent, and varied. When a quantitative model is created based on multivariate analysis such as the principal component regression method and the like, these factors also affect the accuracy of the model and become obstacles against the transfer of the quantitative model. Therefore, these factors must be removed in preprocessing, before the quantitative model is created.

Various techniques for correcting the baseline and background have been known so far. For example, the method of filtering low-frequency components that uses the Fourier transform, the fitting method that searches for minimal values in a middle region, the fitting method that, after enhancing resolution by deconvolution, searches for a peak and reference points on the baseline, and the method of fitting that fits the averaged spectrum (MSC) are known. These fitting methods are different from each other by the targets to be fitted.

Correction of Baseline in Infrared Spectrum Having Flat Regions.

A method of correcting the baseline in an infrared spectrum having flat regions is described in the following.

Figure 36A:
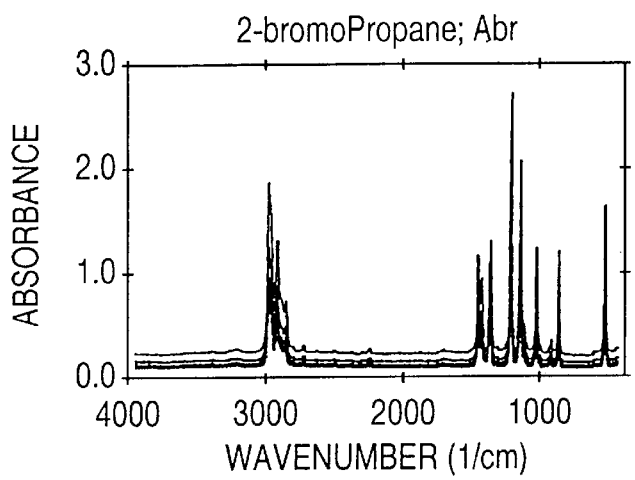
FIGS. 36A to 36C respectively show absorbance spectra, their enlarged spectra near their baselines, and extracted flat regions.

FIG. 36A superimposes absorbance spectra of five samples of different concentrations. As clear from FIG. 36A, the baselines of these absorbance spectra do not agree with each other.

Figure 36B:
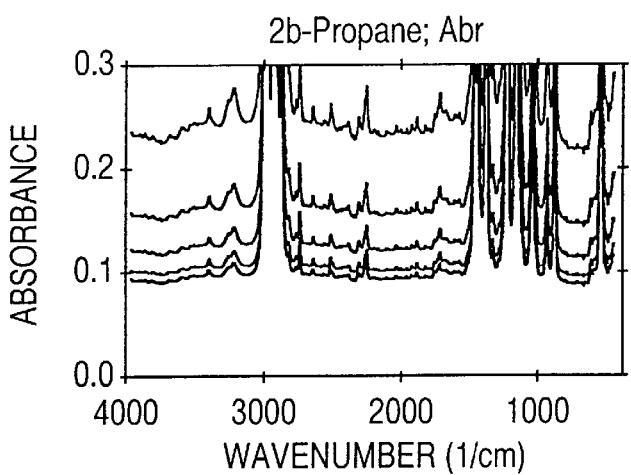

FIG. 36B enlarges the absorbance spectra shown in FIG. 36A near their baselines. If a spectrum has flat regions to both sides of an isolated peak, as in these spectra, its baseline can be estimated by obtaining a straight line or quadratic curve that fits the data points of the flat regions. Whether a region is flat or not can be determined based on the slope or derivative values at the data points in the region.

Figure 36C:
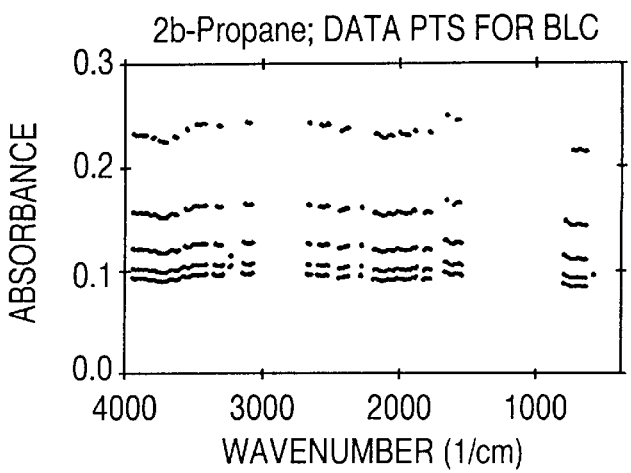

FIG. 36C show flat regions automatically extracted from the spectra of FIG. 36A by applying threshold values to the original spectra and their first and second derivatives.

Figure 37A:
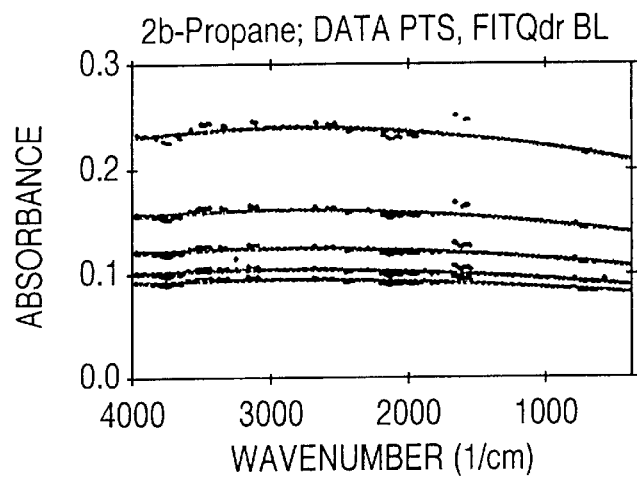
FIGS. 37A to 37C respectively show quadratic curves that fit the data points of the flat regions shown in FIG. 36C, absorbance spectra obtained from the spectra of FIG. 36A by correcting their baselines, and their enlarged absorbance spectra near their baselines.

FIG. 37A shows quadratic curves that fit the data points of the flat regions shown in FIG. 36C. For a region to be flat, the data points in the region should be a set of successive points. Ideally, the abscissas of the region for one sample should agree with the abscissas of corresponding regions for other samples. Differentiation amplifies high-frequency noise, so that when applied to the estimation of the baseline, digital differentiation having great smoothing effects should be employed.

Figure 37B:
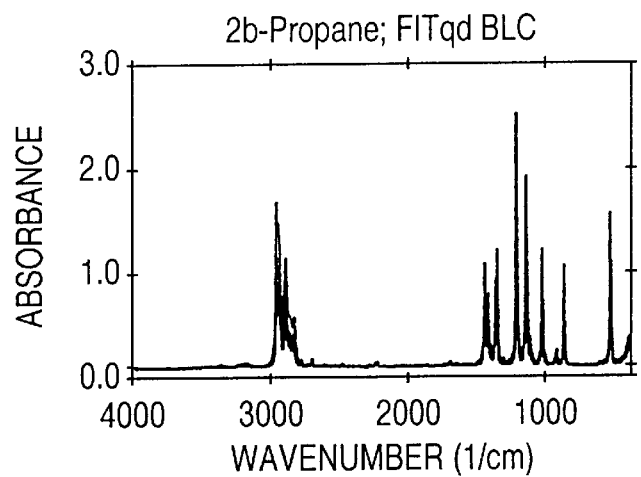
Figure 37C:
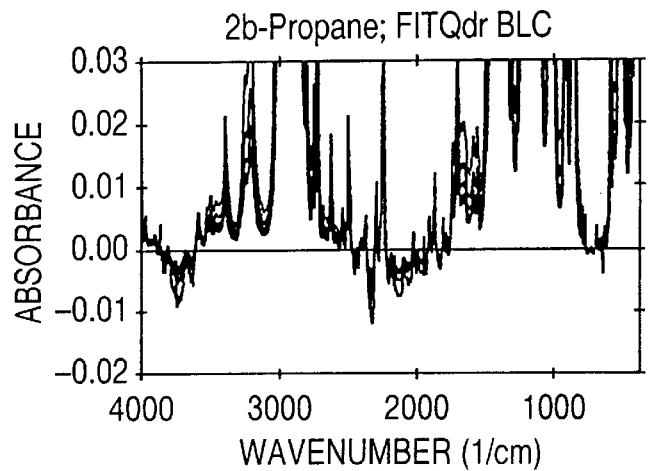

If the estimated baseline is subtracted from the original absorbance spectrum, then a spectrum in which the baseline is corrected is obtained. FIG. 37B shows absorbance spectra obtained from the spectra of FIG. 36A by correcting their baselines. FIG. 37C enlarges the absorbance spectra shown in FIG. 37B near their baselines. As observed from FIG. 37B these baselines do not completely agree with each other.

In curve fitting for an approximating straight line or quadratic curve over a wide range of wavenumbers, the approximating line or curve often does not soundly fit the data points of the whole region. In particular, an approximating quadratic curve is bent in a flat region- and at both ends of the whole region. Even if a higher-degree curve is used, local distortion often becomes great. Therefore, fitting should be performed in each subregion that divides the whole region. Also, spline functions, which oscillate less than polynomials, are preferably used. In order to avoid such deficiency, the end data points of the neighboring extracted flat regions can be connected to each other by a straight line to estimate the points on the straight line, and the obtained piecewise linear curve can be smoothed to obtain an estimated baseline. In this case, bending seen in curve fitting is not observed.

Whether a minimal point of an absorbance spectrum having multiple peaks is a point on the baseline or the trough of a peak is hard to determine. The determination should be made at a universal criterion over the samples. Causes of fluctuations in the baseline are complex and cannot be determined by a criterion inherent to an individual spectrum. Therefore, information about similarity among samples, particularly similarity in characteristic absorption bands, should be used to precisely correct the baseline. The method of 2D plotting and 2D fitting is one of the means for this purpose.

Figure 38A:
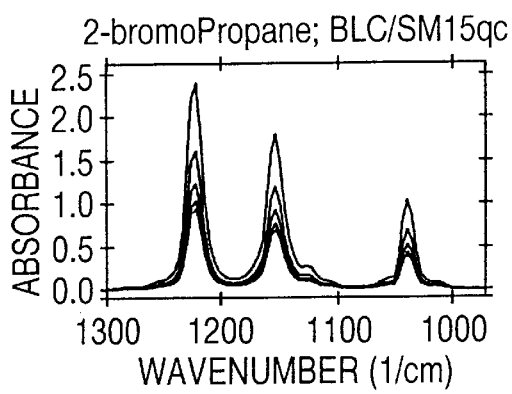
FIGS. 38A to 38D respectively show absorbance spectra in the wavenumber region 1300 to 970 $cm^1$ obtained by correcting their baselines, D2–D0 plotting for the absorbance spectra, absorbance spectra reproduced based on the values estimated by the method of 2D plotting and 2D fitting, and the offset estimated by exterpolation that uses the method of 2D plotting and 2D fitting.
Figure 38B:
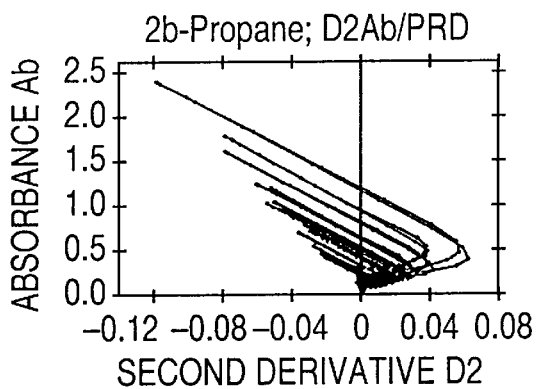
Figure 38C:
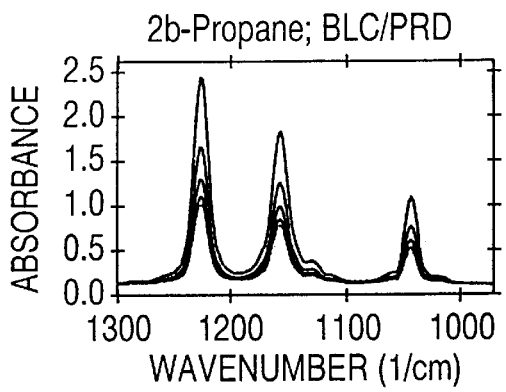
Figure 38D:
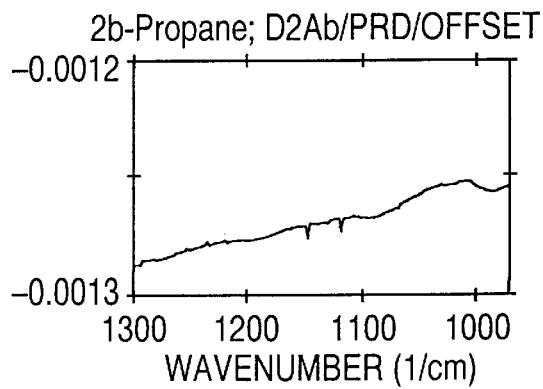

FIG. 38A shows absorbance spectra in the wavenumber region 1300 to 970 cm$^{-1}$ obtained by correcting their baselines by the above method that produced the spectra of FIG. 37B. FIG. 38B shows D2–D0 plottings for the absorbance spectra shown in FIG. 38A. FIG. 38C shows absorbance spectra reproduced based on the values estimated by the method of 2D plotting and 2D fitting. FIG. 38D shows the offset estimated by exterpolation that uses the method of 2D plotting and 2D fitting. The offset is produced mainly by the fact that the baseline correction due to the above method is not complete. Apart from the objective, if a spectrum is further corrected so that the offset should become zero, then a perfect baseline correction can be achieved.

Correction of Baseline for Aqueous Solutions.

Figure 39:
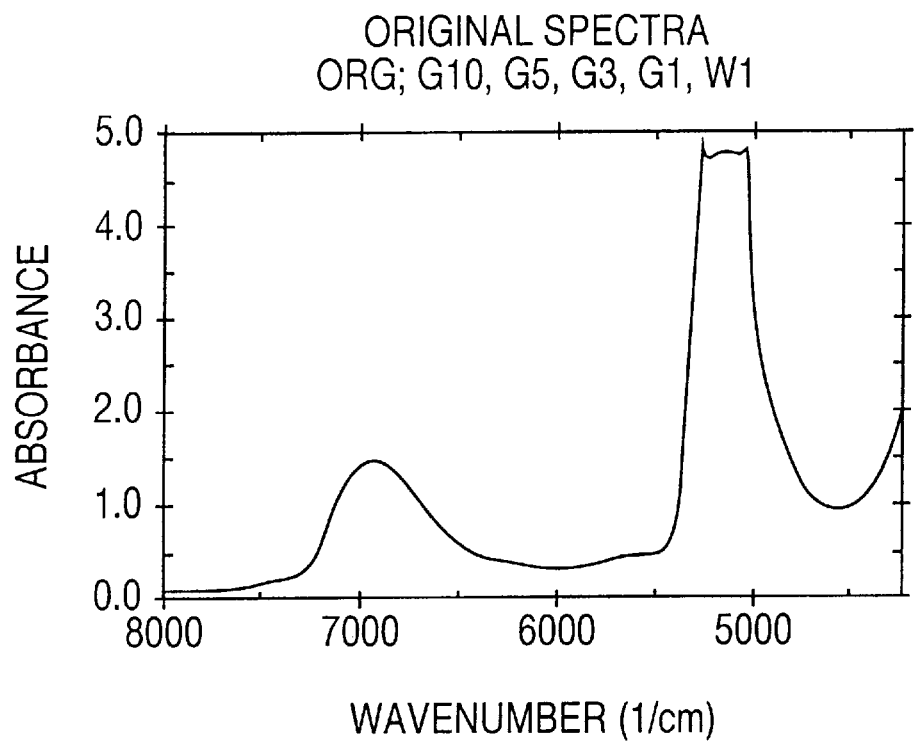
FIG. 39 shows original absorbance spectra of aqueous glucose solutions.
Figure 40:
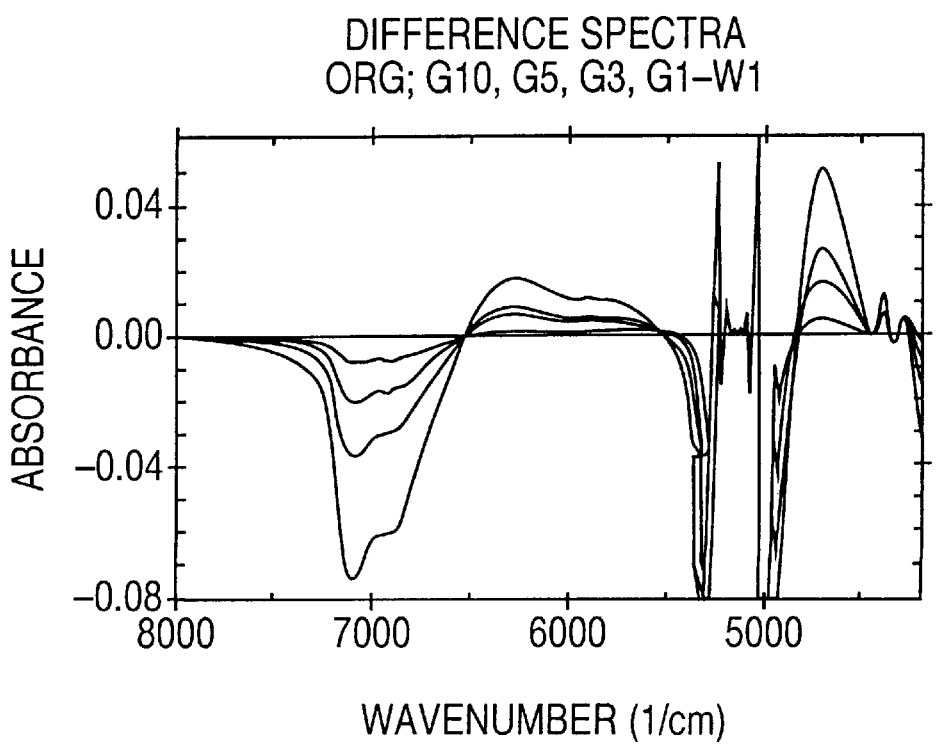
FIG. 40 shows the difference spectra between the absorbance spectra shown in FIG. 39 and the spectrum of pure water.

Correction of the baseline for aqueous solution is described in the following. FIG. 39 shows original absorbance spectra of aqueous glucose solutions. There are no flat regions in the spectra of the aqueous solutions, as seen from FIG. 39. As shown in FIG. 40, the difference spectra between the absorbance spectra and the spectrum of pure water reveal whether the reference lines of these spectra agree with each other or not. Therefore, when flat regions do not exist, what should be taken as the references becomes a problem.

Fortunately, there exist five wavenumber regions in the absorbance spectra of the aqueous glucose solution in the wavenumber region of 8,000 to 4,000 cm$^{-1}$ such that the absorbances are approximately equal to each other on these regions. In the D1–D0 plottings or D2–D0 plottings, the iso-wavenumber line corresponding to a wavenumber (hereafter called equi-absorbance wavenumber) in such wavenumber regions (hereafter called equi-absorbance regions) is parallel to the x-axis. This fact is due to the cancelling effects that the amount of water or the solvent contained in a unit volume or weight is reduced when a component is added to water or the solvent, This fact is different from the existence of an isosbestic point due to a reaction in the compound. The equi-absorbance wavenumbers do not depend on the concentrations of samples, so that they can be used as references for determination.

Figure 41:
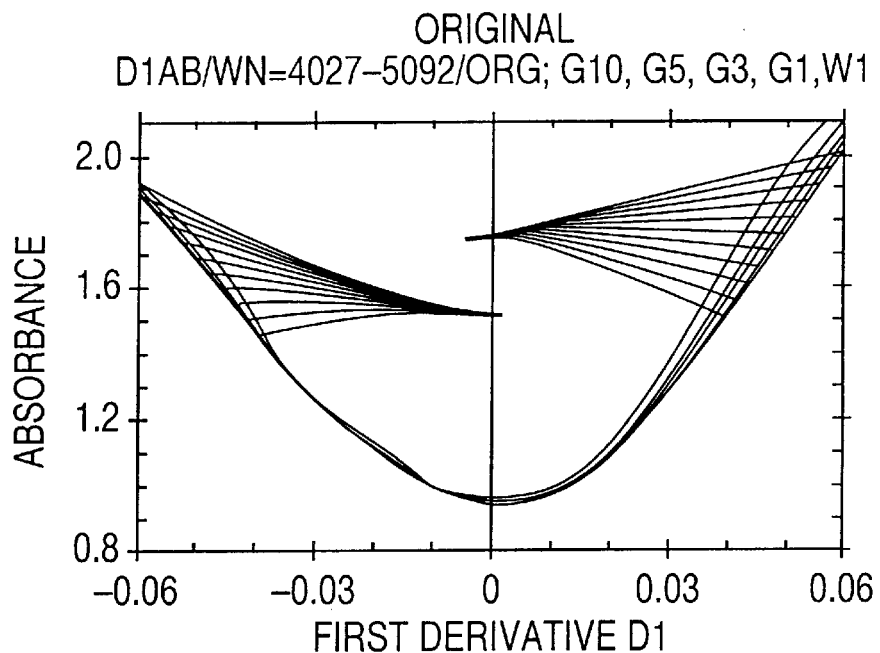
FIG. 41 shows D1–D0 plottings and their iso-wavenumber lines.

FIG. 41 shows how to detect an equi-absorbance wavenumber in the D1–D0 plottings. First, the slopes of the iso-wavenumber lines change their signs near an equi-absorbance wavenumber. An iso-wavenumber line that is the closest to a horizontal line is selected. The spectral data is digitized with a data interval, so that the perfectly horizontal line must be obtained through interpolation, but rigorous calculation is not necessary, since the baseline varies gradually. The data interval can be determined adequately. The abscissa of an equi-absorbance point of each sample is defined as the abscissa of the spectral data points that is closest to the equi-absorbance wavenumber. Then, on the D1–D0 plottings, the straight line perpendicular to the iso-wavenumber line at the equi-absorbance wavenumber is drawn from the plotted point (of the sample) corresponding to the wavenumber that is the abscissa of the equi-absorbance point, and the ordinate of the intersection of the two lines is defined as the ordinate of the equi-absorbance point. The average of the ordinates of the equi-absorbance points having the same abscissa over all samples is taken as a most plausible equi-absorbance value, and the abscissa is taken as a most plausible equi-absorbance wavenumber. There may exist a plurality of most plausible equi-absorbance wavenumbers, for example, two in FIG. 41. Therefore, for each sample, consider the pairs of coordinates (Most plausible equi-absorbance wavenumber, Ordinate of the data point at most plausible equi-absorbance wavenumber—Most plausible equi-absorbance value) and obtain by least squares regression, an approximating curve that fits these pairs. The obtained curve serves as the baseline of the original spectrum of the sample.

Further, a D1–D0 plotting is redrawn, through differentiation, for the spectrum obtained by subtracting the baseline from each original absorbance spectrum. Then for each iso-wavenumber line, the estimated values of data points are obtained by curve fitting so that the sum of squared errors in both the abscissas and ordinates should become minimum. In this way, the estimated spectrum for each sample is obtained.

FIGS. 43A to 43C respectively show the difference spectra before correction and their enlarged graphs in two equi-absorbance regions.

FIGS. 44A to 44C respectively show the difference spectra after correction and their enlarged graphs in two equi-absorbance regions.

Figure 42:
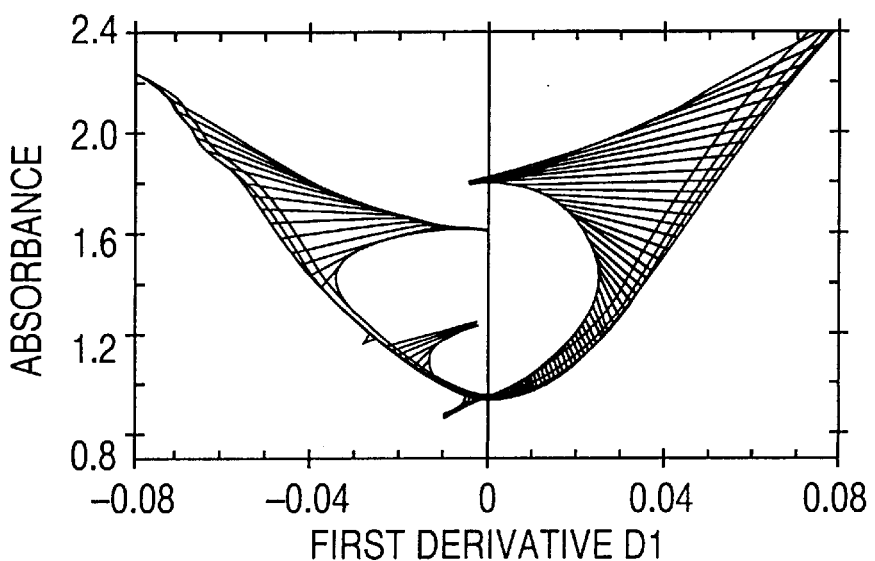
FIG. 42 shows D1–D0 plottings and their iso-wavenumber lines after correction.

Errors accompanying mathematical procedures can be moderated by smoothing processing if necessary. By extending iso-wavenumber lines, a standard pattern of iso-wavenumber lines that contains converging points as shown in FIG. 42 is obtained.

The above first procedure for 2D plotting is performed for Correction of the baseline. Derivatives having great smoothing effects should be used there. The second procedure for 2D plotting is performed for estimating real spectra. Characteristic absorption regions or wavenumber regions where similarity between spectra is great should be considered there.

When a standard pattern of equi-wavenumber lines is obtained, it can be used for correcting fluctuations in the baseline of a spectrum and other errors, as if a calibration model has been created. Effects of correcting distortions of a spectrum as well as effects of smoothing a spectrum are reflected in a spectrum estimated by the 2D plotting and 2D fitting of the present invention.

Figure 45:
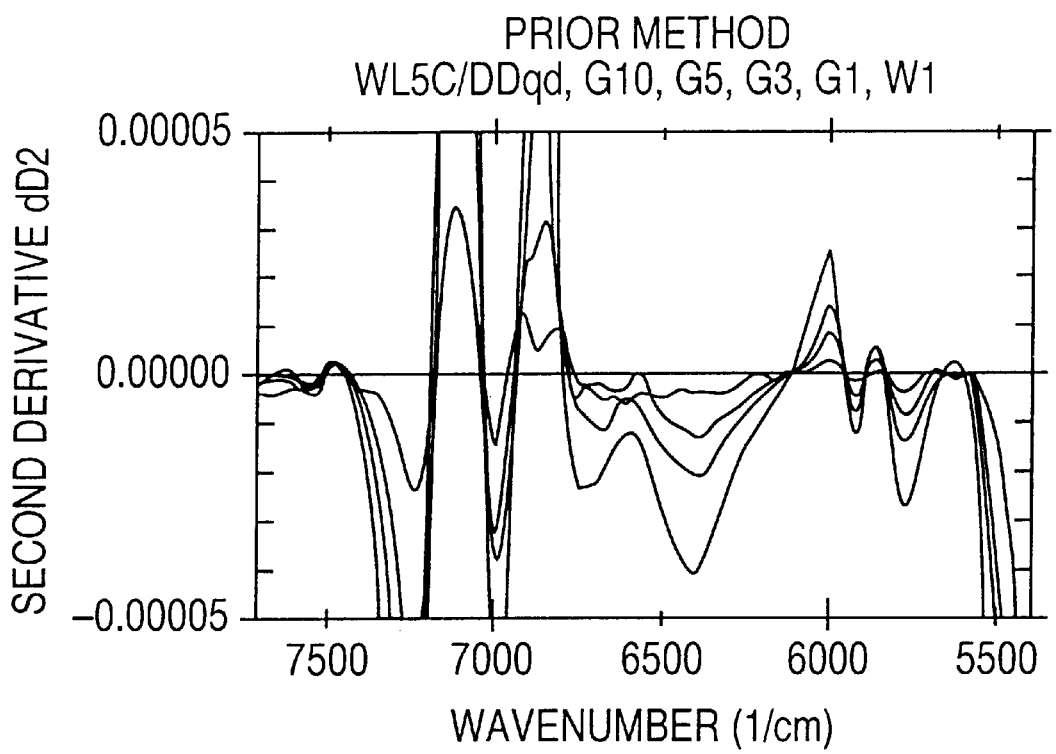
FIG. 45 shows second derivative spectra obtained by a prior ordinary method.
Figure 46:
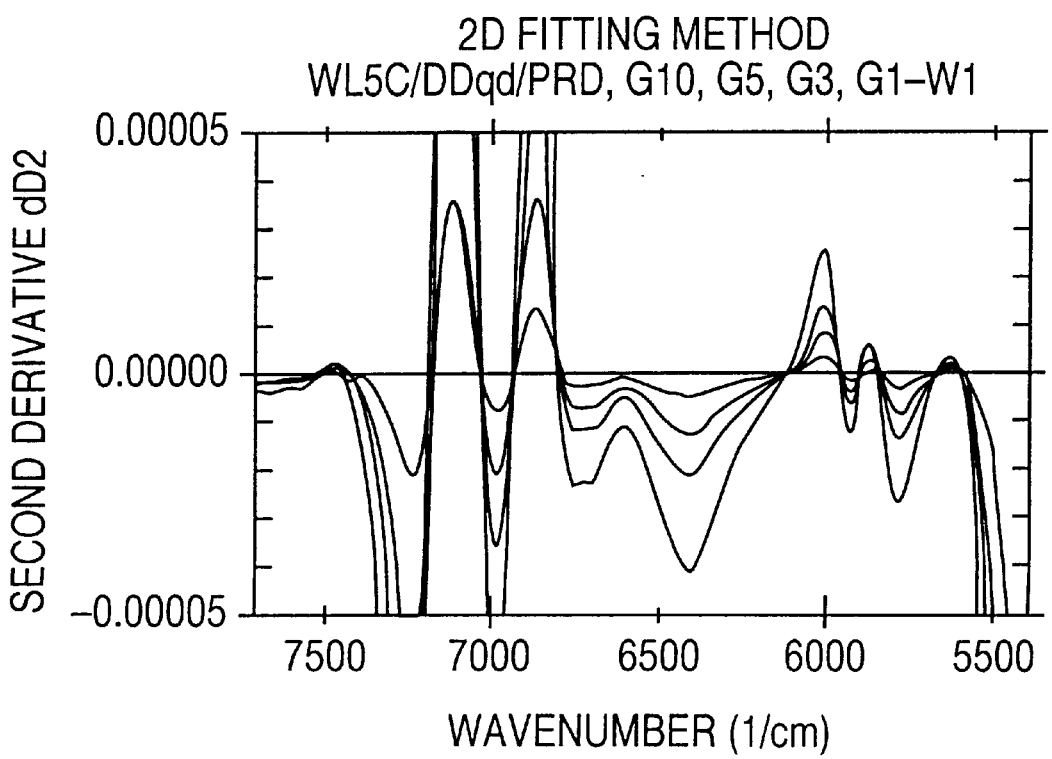
FIG. 46 shows second derivative spectra obtained by the present method of D2–D0 plotting.

FIGS. 45 and 46 respectively show second derivative spectra obtained by a prior ordinary method and second derivative spectra obtained by the present method of D2–D0 plotting. As clear from the figures, noise and distortion are reduced in the second derivative spectra due to the 2D plotting method of the present invention.

In aqueous solutions, if 2D plotting is performed for difference spectra, then amounts of differences between spectra can be made large. Also, the profiles of mixed components can be easily understood.

As described above, according to the present invention, more accurate feature information can be obtained in greater amounts from the spectral data of analyzed objects. Further, the reference of determination or the baseline can be easily equalized or corrected.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of processing spectral data in two-dimensional representation comprising the steps of:

preparing spectral data as an output signal of a spectrometer for a predetermined analyzed object, intensity of said output signal being expressed as a function of time, wavenumber or wavelength thereof;

calculating values of $n_1$th derivative and $n_2$th derivative of said output signal intensity at a plurality of points on a spectral profile of said spectral data with respect to time, wavenumber or wavelength thereof, said $n_1$ and $n_2$ being two positive integers different to each other;

forming a two-dimensional derivative spectral profile of said spectral data by plotting coordinates (u, v) consisting of the $n_1$th derivative value u and the $n_2$th derivative value v corresponding to the varying wavenumber in a two-dimensional coordinate space, and obtaining desired feature information about said spectral data, based on said two-dimensional derivative spectral profile.

2. The method of processing spectral data in two-dimensional representation according to claim 1, wherein said $n_1$ and $n_2$ are less than or equal to 4, respectively.

3. The method of processing spectral data in two-dimensional representation according to claim 2, wherein each of said $n_1$th and $n_2$th derivatives is calculated by repeating numerical differentiation by the order of the derivative, said numerical differentiation being performed by first obtaining an approximating quadratic polynomial for each abscissa x of data points by least-squares curve fitting from the data points of a predetermined size of an interval containing x and then differentiating the obtained quadratic polynomial at x.

4. The method of processing spectral data in two-dimensional representation according to claim 3, wherein said two-dimensional derivative spectral profile is created for each of a plurality of analyzed objects and displayed in the same two-dimensional coordinate space, and feature information about said spectral data is obtained by adding straight lines that connect each pair of points corresponding to the same time, wavenumber or wavelength in the displayed two-dimensional derivative spectral profiles.

5. The method of processing spectral data in two-dimensional representation according to claim 4, wherein
if it is predicted, from properties of said analyzed objects, that all points corresponding to the same time, wavenumber or wavelength are on a single straight line, then said straight line is determined by the method of least squares, and said spectral data is corrected so that points corresponding to the same time, wavenumber, wavelength should be on said straight line.

6. The method of processing spectral data in two-dimensional representation according to claim 3, wherein said feature information is the degree of agreement or symmetry of said spectral profile in predetermined time domains, wavenumber domains or wavelength domains.

7. The method of processing spectral data in two-dimensional representation according to claim 4, wherein said feature information is linearity of the spectrometer that collects said spectral data.

8. The method of processing spectral data in two-dimensional representation according to claim 2, wherein each of said $n_1$th and $n_2$th derivatives is calculated by repeating numerical differentiation by the order of the derivative, said numerical differentiation being performed by first obtaining an approximating cubic or quartic polynomial for each abscissa x of data points by least-squares curve fitting from the data points of a predetermined size if an interval containing x and then differentiating the obtained cubic or quartic polynomial at x.

9. The method of processing spectral data in two-dimensional representation according to claim 8, wherein said two-dimensional derivative spectral profile is created for each of a plurality of analyzed objects and displayed in the same two-dimensional coordinate space, and feature information about said spectral data is obtained by adding straight lines that connect each pair of points corresponding to the same time, wavenumber or wavelength in the displayed two-dimensional derivative spectral profiles.

10. The method of processing spectral data in two-dimensional representation according to claim 9, wherein
if it is predicted, from properties of said analyzed objects, that all points corresponding to the same time, wavenumber or wavelength are on a single straight line, then said straight line is determined by the method of least squares, and said spectral data is corrected so-that points corresponding to the same time, wavenumber, wavelength should be on said straight line.

11. The method of processing spectral data in two-dimensional representation according to claim 8, wherein said feature information is the degree of agreement or symmetry of said spectral profile in predetermined time domains, wavenumber domains or wavelength domains.

12. The method of processing spectral data in two-dimensional representation according to claim 9, wherein said feature information is linearity of the spectrometer that collects said spectral data.

13. The method of processing spectral data in two-dimensional representation according to claim 2, wherein $n_1$th and $n_2$th derivative values can be calculated by using optimal parameters for numerical differentiation.

14. The method of processing spectral data in two-dimensional representation according to claim 13, wherein said optimal parameters for numerical differentiation are determined by said feature information.

15. The method of processing spectral data in two-dimensional representation according to claim 1, further comprising the step of;
correcting references for determination among the spectral data by using said feature information.

16. The method of processing spectral data in two-dimensional representation according to claim 15, wherein said references for determination are baselines.

17. The method of processing spectral data in two-dimensional representation according to claim 1, further comprising the steps of:
correcting references for determination among the spectral data by using said feature information; and
forming corrected two-dimensional derivative spectral profiles using spectral data corrected by said references for determination.

* * * * *